US010536881B2

United States Patent
Jeong

(10) Patent No.: US 10,536,881 B2
(45) Date of Patent: Jan. 14, 2020

(54) METHOD AND APPARATUS FOR IMPROVING QUALITY OF SERVICE THAT A USER EXPERIENCES WHEN MEDIA IS TRANSMITTED THROUGH WLAN

(71) Applicant: Samsung Electronics Co., Ltd., Gyeonggi-do (KR)

(72) Inventor: Sangsoo Jeong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 11 days.

(21) Appl. No.: 14/721,905

(22) Filed: May 26, 2015

(65) Prior Publication Data

US 2015/0341830 A1 Nov. 26, 2015

(30) Foreign Application Priority Data

May 23, 2014 (KR) .................. 10-2014-0062287
Sep. 3, 2014 (KR) .................. 10-2014-0117261

(51) Int. Cl.
*H04W 36/00* (2009.01)
*H04W 28/02* (2009.01)
(Continued)

(52) U.S. Cl.
CPC ... *H04W 36/0022* (2013.01); *H04W 28/0268* (2013.01); *H04W 72/0406* (2013.01); *H04W 84/12* (2013.01)

(58) Field of Classification Search
CPC ..... H04W 48/18; H04W 84/12; H04W 28/08; H04W 28/02; H04W 28/0247;
(Continued)

(56) References Cited

U.S. PATENT DOCUMENTS 8,774,090 B2    7/2014  Giaretta et al.
9,295,089 B2 *  3/2016  Chitrapu ............... H04W 48/18
(Continued)

FOREIGN PATENT DOCUMENTS

CN    101297522 A    10/2008
CN    102742325 A    10/2012
(Continued)

OTHER PUBLICATIONS

International Search Report dated Sep. 2, 2015 in connection with International Application No. PCT/KR2015/005261; 3 pages.
(Continued)

*Primary Examiner* — Marsha D Banks Harold
*Assistant Examiner* — Elton Williams

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.
Systems and methods provide a service that effectively transmits or receives data simultaneously using a 3GPP system, such as Long Term Evolution (LTE), and a non-3GPP system, such as a Wireless Local Area Network (WLAN), in a network where the 3GPP system and the non-3GPP system coexist. Particularly, this is a technology of selecting an access network through which data is to be transmitted based on a user's preference and a network condition so as to improve the quality of a service that a user experiences during data transmission.

12 Claims, 15 Drawing Sheets

(51) Int. Cl.
*H04W 72/04* (2009.01)
*H04W 84/12* (2009.01)

(58) Field of Classification Search
CPC ......... H04W 28/0268; H04W 28/0289; H04W 28/10; H04W 76/025; H04W 36/14; H04W 36/0027; H04W 88/06; H04W 88/16; H04W 36/08; H04W 36/0022; H04W 36/125; H04W 8/24; H04W 8/18; H04W 8/20; H04W 72/0406; H04W 84/042; H04L 12/5692; H04L 45/308; H04L 47/122; H04L 45/22; H04L 45/28; H04N 21/25808; H04N 21/472; Y02D 70/142; Y02D 70/1262; Y02D 70/1264; Y02D 70/21

See application file for complete search history.

(56) References Cited

U.S. PATENT DOCUMENTS

| | | | |
|---|---|---|---|
| 9,717,019 | B2 | 7/2017 | Duan et al. |
| 2002/0038370 | A1 | 3/2002 | Demoto et al. |
| 2007/0019580 | A1 | 1/2007 | Zhang et al. |
| 2007/0211674 | A1* | 9/2007 | Ragnar Karlberg .. H04W 48/18 370/338 |
| 2009/0286527 | A1 | 11/2009 | Cheon et al. |
| 2010/0077057 | A1* | 3/2010 | Godin ................ H04L 65/4038 709/218 |
| 2012/0066612 | A1* | 3/2012 | Virmani ................ G06F 3/0481 715/748 |
| 2014/0011538 | A1* | 1/2014 | Mulcahy ............. H04L 67/2842 455/553.1 |
| 2014/0068212 | A1* | 3/2014 | Lin ....................... H04M 15/58 711/162 |
| 2014/0086226 | A1 | 3/2014 | Zhao |
| 2014/0161055 | A1 | 6/2014 | Chitrapu et al. |
| 2014/0204909 | A1* | 7/2014 | Cheng .................. H04W 8/082 370/331 |
| 2015/0036672 | A1 | 2/2015 | Kim et al. |
| 2015/0163811 | A1* | 6/2015 | Konstantinou ..... H04W 76/026 370/329 |
| 2015/0289182 | A1 | 10/2015 | Peisa et al. |
| 2016/0295614 | A1* | 10/2016 | Lee ....................... H04W 48/08 |

FOREIGN PATENT DOCUMENTS

| | | |
|---|---|---|
| CN | 102752825 A | 10/2012 |
| CN | 103716775 A | 4/2014 |
| WO | 2012033774 A2 | 3/2012 |
| WO | 2013042330 A1 | 3/2013 |
| WO | WO 2013/141560 A1 | 9/2013 |
| WO | WO 2014/070100 A1 | 5/2014 |

OTHER PUBLICATIONS

Communication from a foreign patent office in a foreign counterpart application, European Patent Office, "Supplementary European Search Report," Application No. EP 15 79 6686.2, dated Dec. 11, 2017, 13 pages.
3GPP TS 23.402 V12.4.0 (Mar. 2014), Technical Specification, 3rd Generation Partnership Project; Technical Specification Group Services and System Aspects; Architecture enhancements for non-3GPP accesses (Release 12), 288 pages.
Office Action dated Sep. 2, 2019 in connection with Chinese Patent Application No. 201580040130.0, 19 pages.

* cited by examiner

METHOD AND APPARATUS FOR IMPROVING QUALITY OF SERVICE THAT A USER EXPERIENCES WHEN MEDIA IS TRANSMITTED THROUGH WLAN

CROSS-REFERENCE TO RELATED APPLICATION(S) AND CLAIM OF PRIORITY

The present application is related to and claims priority under 35 U.S.C. § 119(a) to Korean Application Serial Nos. 10-2014-0062287 and 10-2014-0117261, which were filed in the Korean Intellectual Property Office on May 23, 2014 and Sep. 3, 2014 respectively, the entire contents of which are hereby incorporated by reference.

TECHNICAL FIELD

The present disclosure relates to a technology for providing a service that effectively transmits or receives data simultaneously using a 3GPP system, such as Long Term Evolution (LTE), and a non-3GPP system, such as a Wireless Local Area Network (WLAN), in a network where the 3GPP system and the non-3GPP system coexist. Particularly, embodiments of the present disclosure provide a technology of selecting an access network through which data is to be transmitted based on a user's preference and a network condition, so as to improve the quality of a service that a user experiences during data transmission.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In general, a mobile communication system was developed to provide voice services while enabling activity of users. However, the mobile communication systems have extended their fields to the data services beyond the voice communication service and have now developed to such a level that the mobile communication systems can provide high speed data service. Meanwhile, resource shortages have arisen in the mobile communication systems providing services, and due to users' demands for higher speed services, more developed mobile communication systems are required.

To meet the demands, standardization of Long Term Evolution (LTE) has progressed by the Third Generation Partnership Project (3GPP) as one of the next generation mobile communication systems that are being developed. LTE is a technology of implementing high speed packet based communication with a transmission rate of up to about 100 Mbps. To this end, several methods are discussed, including a method of reducing the number of nodes located on a communication channel by simplifying a network architecture, a method of making wireless protocols closest to a wireless channel, and the like.

SUMMARY

When a User Equipment (UE) uses a service connected to a predetermined Packet Data Network (PDN) through a non-3GPP system, connection from the UE to a Packet Data Network Gateway (PGW) needs to be established. Although a UE accesses a PDN through a WLAN, for the configuration of an operator network and the improvement of a degree of freedom of services provided to a user, the establishment of one or more PDN connections with respect to a PDN having an identical Access Point Name (APN) should be allowed. Alternatively, a method of supporting a UE to transmit or receive traffic through both a 3GPP system and a non-3GPP system, using a single IP address, may be allowed. In this instance, establishment and termination of the connection, and an access network through which traffic is to be transmitted may be determined based on user subscription information or an operator network condition. When data transmission that begins in the state where a UE simultaneously accesses a 3GPP access network and a WLAN network, fails due to the loss of the connection with the WLAN network, and remaining data is transmitted through the 3GPP access network without any notification to a user, the user may receive an enormous charge bill or may feel deterioration in quality of service.

To address the above-discussed deficiencies, it is a primary object to provide a method and apparatus for effectively controlling connection and traffic transmission and reception.

According to embodiments of the present disclosure, a method for a UE that is capable of accessing a first network and a second network, to transmit or receive traffic, is provided. The method includes: obtaining control information for selecting a network through which traffic is to be transmitted or received; transmitting the obtained control information to a PGW; receiving, from the PGW, a response to the transmitted control information; and transmitting or receiving the traffic through one of the first network and the second network, based on the control information.

According to embodiments of the present disclosure, a UE that transmits or receives traffic through one of a first network and a second network, is provided. The UE includes: a communication unit that executes data communication; and a controller that obtains control information for selecting a network through which traffic is to be transmitted or received, transmits the obtained control information to a PGW, receives a response to the transmitted control information from the PGW, and transmits or receives the traffic through one of the first network and the second network based on the control information.

According to embodiments of the present disclosure, a method for a network device to connect to a UE is provided. The method includes: receiving, from the UE, a connection request message including control information; transmitting the control information included in the connection request message to a PGW; and receiving a response to the control information from the PGW, wherein the control information is information for determining one of a first network and a second network, through which traffic is to be transmitted.

According to embodiments of the present disclosure, a network device to connect to a UE is provided. The device includes: a communication unit that executes data communication; and a controller that receives a connection request message including control information from the UE, transmits the control information included in the connection request message to a PGW, and receives a response to the control information from the PGW, wherein the control information is information for determining one of a first network and a second network, through which traffic is to be transmitted.

According to embodiments of the present disclosure, a method for a PGW that is connected with a first network and a second network, to determine transmission or reception of traffic, is provided. The method includes: receiving, from a UE, control information for determining a network through which traffic is to be transmitted or received; and transmitting a response message in response to the received control information, wherein the control information is information for determining one of the first network and the second network, through which traffic is to be transmitted.

According to embodiments of the present disclosure, a PGW that is connected with a first network and a second network is provided. The PGW includes: a communication unit that executes data communication; and a controller that receives, from a UE, control information for determining a network through which traffic is to be transmitted or received, and transmits a response message to the received control information, wherein the control information is information for determining one of the first network and the second network, through which traffic is to be transmitted.

According to various embodiments of the present disclosure, a traffic transmission path of a UE that is capable of simultaneously accessing a 3GPP network and a non-3GPP network, may be controlled by a network, and the traffic transmission path may be determined based on a network and a state of the UE and thus, limited communication resources may be effectively utilized.

Also, according to various embodiments of the present disclosure, when a connection with a part of access networks through which data is transmitted or received, is lost, whether to transmit remaining data through an access network that holds a connection is controlled based on a network stare or a user's preference and thus, an unreasonable charge bill may not be made or the quality of service that the user experiences may not be deteriorated.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
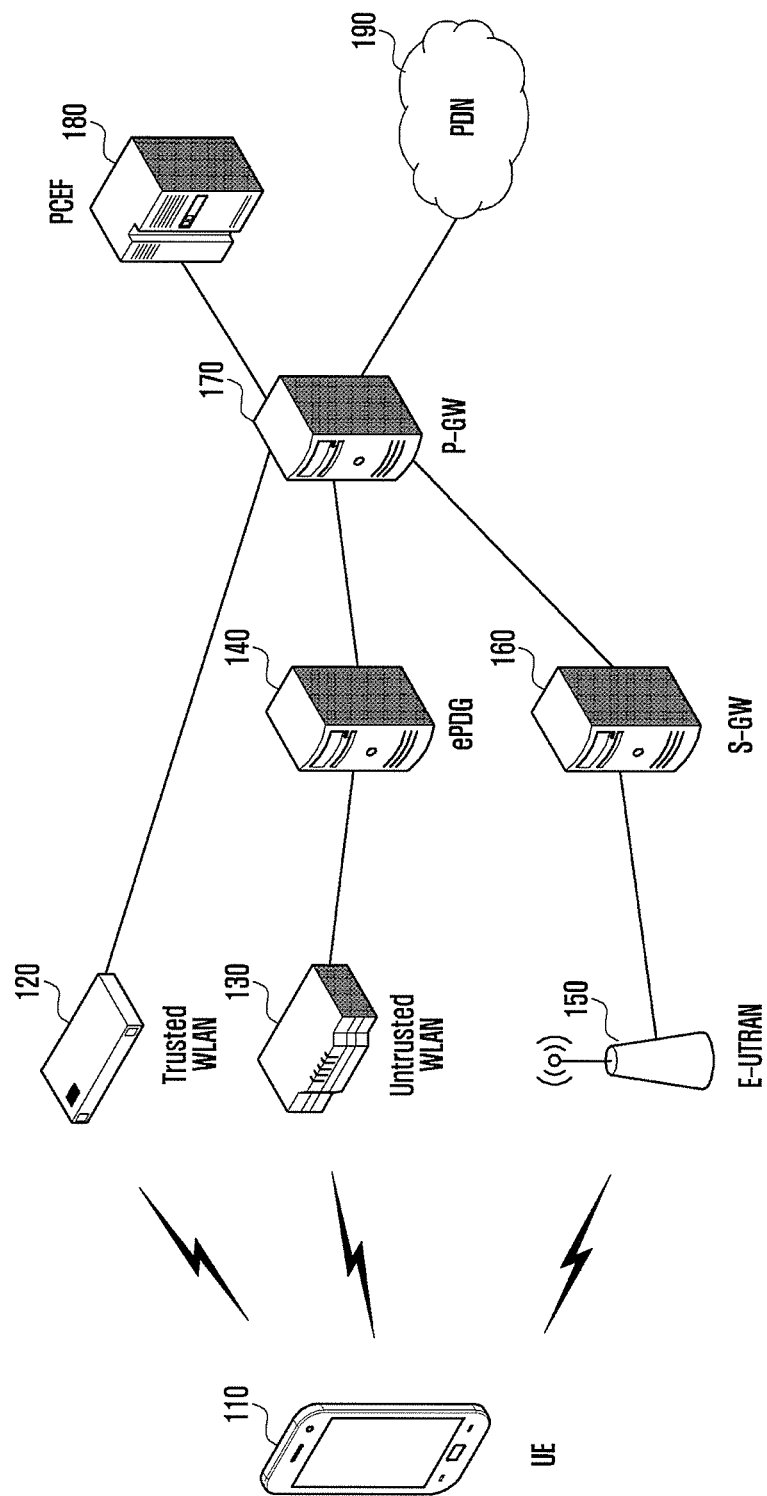
FIG. 1 schematically illustrates the case in which a User Equipment (UE) transmits or receives data simultaneously using a 3GPP access network and a non-3GPP access network, according to embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Hereinafter, embodiments of the present disclosure will be described in detail with reference to the accompanying drawings.

In describing the embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present invention is defined by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the terms "unit" or "module" refers to a software element or a hardware element, such as a Field Programmable Gate Array (FPGA) or an Application Specific Integrated Circuit (ASIC), which performs a predetermined function. However, the meaning of the terms "unit" or "module" is not limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, data-base, data structures, tables, arrays, and parameters. The elements and functions provided by the "unit" or "module" may be either combined into a smaller number of elements, "units," or "modules" or divided into a larger number of elements, "units," or "modules." Moreover, the elements and "units" or "modules" may be implemented to reproduce one or more CPUs within a device or a security multimedia card.

Also, to describe embodiments of the present disclosure in detail, descriptions will be provided mainly from the perspective of a basic Third Generation Partnership Project (3GPP) LTE system and a Wireless Local Area Network (WLAN) so called WiFi, as a non-3GPP access network. However, the subject matter of the embodiments of the present disclosure may be slightly modified within the scope of the embodiments of the present disclosure and may be applied to other communication/computer systems that have a similar technical background and systems, and this may be implemented by the determination of those skilled in the art.

For example, the present disclosure may be applied to a 1x/CDMA2000 system or a WiMAX system, instead of the WLAN.

In the mobile communication system, a User Equipment (UE) may simultaneously utilize a plurality of heterogeneous networks. Particularly, the UE may simultaneously use a 3GPP access network, such as GERAN, UTRAN, and E-UTRAN, and a non-3GPP access network, such as Wireless Local Area Network (WLAN). For example, the UE may access a WLAN for different traffic to transmit/receive data while accessing E-UTRAN to transmit/receive data. In this instance, there is a desire for a method and an apparatus for optimally controlling an access network through which traffic for the UE is to be transmitted, based on user subscription information, a network condition, or the like.

FIG. 1 illustrates the case in which a User Equipment (UE) transmits or receives data simultaneously using a 3GPP access network and a non-3GPP access network according to embodiments of the present disclosure.

Referring to FIG. 1, although a WLAN is illustrated as an example of a non-3GPP access network 120 and 130, the non-3GPP access network 120 and 130 may include other non-3GPP standard access networks, for example, a 1x/CDMA2000/HRPD access network or a WiMAX network, in addition to the WLAN.

The non-3GPP access network 120 and 130 may be roughly classified into a trusted non-3GPP access network 120 (hereinafter, a trusted non-3GPP access network, a trusted WLAN, and the like are interchangeably used) and an untrusted non 3-GPP access network 130 (hereinafter an untrusted non-3GPP access network, an untrusted WLAN, and the like are interchangeably used). The non-3GPP access network 120 and 130 may be distinguished based on whether an operator trusts the non-3GPP access network that is connected to an operator network. When the non-3GPP access network is untrusted (untrusted non-3GPP access network 130), the non-3GPP access network may be connected to a 3GPP operator network, for example, a PDN Gateway (P-GW) 170, through an evolved Packet Data Gateway (ePDG) 140. In various embodiments of the present disclosure, an operator may include an operator who operates a 3GPP access network, and a non-3GPP access network may be a service provider who has a contract with the 3GPP operator.

Unlike the above, the trusted non-3GPP access network 120 may be directly connected to the P-GW 170, without the ePDG 140.

Although the description of FIG. 1 refers to the non-3GPP access network 120 and 130 as a single entity for ease of description, the non-3GPP access network 120 and 130 may be a network formed of a plurality of access points. Particularly, the trusted non-3GPP access network 120 is configured through WLAN, this may be referred to as a Trusted WLAN Access Network (TWAN), and the TWAN may include one or more WiFi access points and a Trusted WLAN Access Gateway (TWAG). In this instance, the WiFi access point is connected to a 3GPP operator network through the TWAG. The TWAG may be embodied to be physically separated from the WiFi access point, or may be embodied through a separate logical module included in a single device.

As illustrated in FIG. 1, a User Equipment (UE) 110 may use a Non-Seamless WLAN offloading (NSWO) technology which enables the UE to directly transmit or receive traffic to/from an external PDN 190 (for example, Internet) through the trusted WLAN 120 or the untrusted WLAN 130, without passing an operator core network.

In various embodiments of the present disclosure, a 3GPP mobile communication system, particularly, an LTE system, may include a next generation base station (for example, an Evolved Node B, an EUTRAN, an eNB, and a Node B) 150 and a Serving Gateway (S-GW) 160, and the UE 110 may access an external network through the eNB 150, the S-GW 160, and the P-GW 170. The P-GW 170 generally includes a Policy and Charging Enforcement Function (PCEF) 180, and when the PCEF 180 is embodied separately from the P-GW 170, embodiments of the present disclosure may use the PCEF 180 instead of the P-GW 170.

The PCEF 180 is a device for controlling a policy associated with Quality of Service (QoS) for a user, and a Policy and Charging Control (PCC) rule corresponding to the policy may be transferred to the P-GW 170, and may be applied.

The eNB 150 is a Radio Access Network (RAN) node, and may execute a function corresponding to a Radio Network Controller (RNC) of a UTRAN system, and a Base Station Controller (BSC) of a GERAN system. The eNB 150 is connected to the UE 110 through a wireless channel and performs a similar function as that of an RNC or BSC. Also, the eNB 150 may simultaneously use a plurality of cells. Therefore, embodiments of the present disclosure may be applied to a 2G/3G legacy network when the UTRAN or the GERAN is used instead of the eNB (E-UTRAN) 150.

The S-GW 160 is a device for providing a data bearer, and may generate or remove a data bearer context based on a control of a Mobility Management Entity (MME). The function of the S-GW 160 may correspond to a function of a Serving GPRS Support Node (SGSN) in the 2G/3G network.

In a wireless communication system such as LTE, a unit to which QoS may be applied is an EPS bearer. One EPS bearer is used to transport IP flows having the same QoS requirements. A parameter associated with the QoS may be designated to the EPS bearer, and the parameter associated with the QoS may include a QoS Class Identifier (QCI) and an Allocation and Retention Priority (ARP).

In various embodiments of the present disclosure, the EPS bearer may correspond to a PDP context of the GPRS system. When the UE 110 accesses an Evolved Packet Core (EPC) through the 3GPP or non-3GPP access network, the UE 110 establishes a PDN connection. The PDN connection may include one or more EPS bearers, and an IP address is assigned for each PDN connection. Hereafter, in the descriptions of embodiments of the present disclosure, the term 'PDN connection' or 'connection' may include a logical path through which a UE exchanges data with a PDN based on an IP address over a core network.

Figure 2:
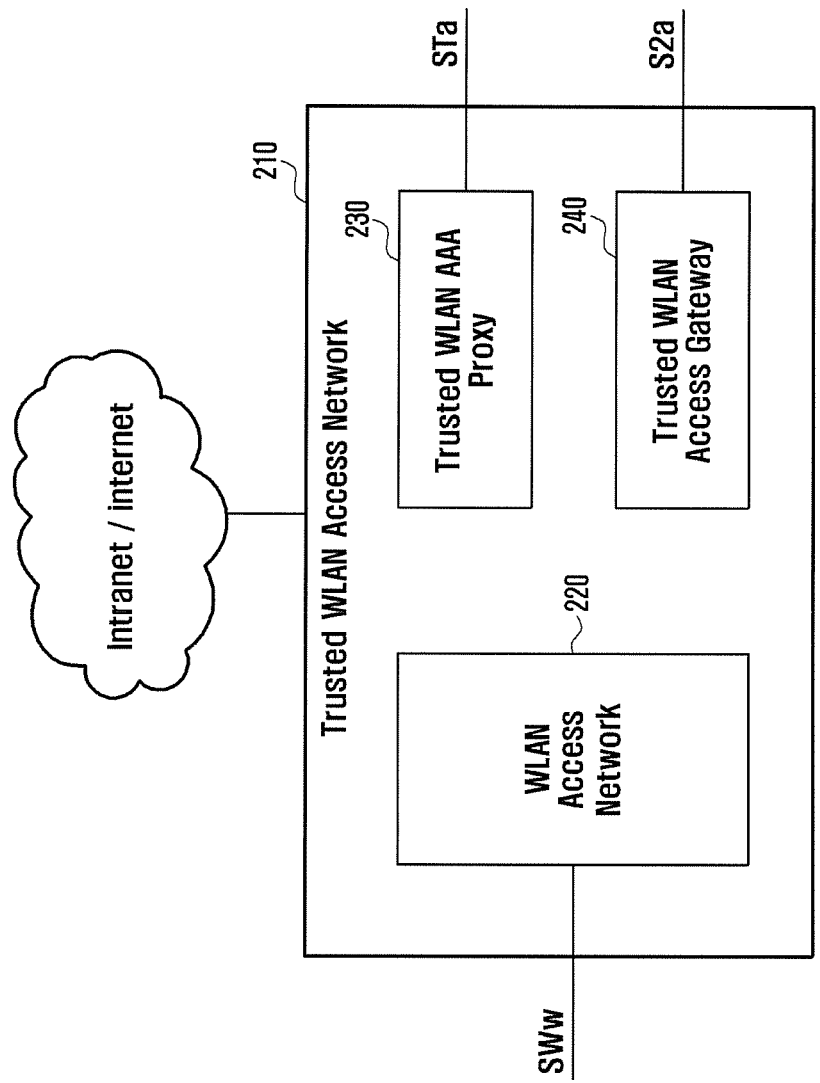
FIG. 2 illustrates a block diagram of a Trusted Wireless Local Area Network Access Network (TWAN) according to embodiments of the present disclosure.

FIG. 2 is a block diagram of a Trusted WLAN Access Network according to embodiments of the present disclosure, and the TWAN is a kind of trusted non-3GPP access network that has been described in FIG. 1.

Referring to FIG. 2, a Trusted WLAN Access Network (TWAN) 210 may include a WLAN Access Network 220 formed of one or more WLANs, a trusted WLAN authentication, authorization and accounting (AAA) proxy 230 for interoperating with AAA, and a Trusted WLAN Access Gateway (TWAG) 240 for connecting the WLAN Access Network 210 and a P-GW.

An interface between the TWAG 240 and the P-GW may be referred to as S2a, through which protocols such as a GPRS Tunneling Protocol (GTP) or a Proxy Mobile IP (PMIP) may be used. The above structure is only a logical structure, and, in practice, a physical configuration may be free. Also, depending on embodiments, the WLAN Access Network 220 and the TWAG 240 may be embodied in a physically identical entity in a communication system.

Hereinafter, the above described drawbacks, that is, when a UE is capable of simultaneously utilizing a non-3GPP access network and a 3GPP access network, a method of establishing or managing a connection and a method of determining an access network through which predetermined traffic is to be transmitted based on user subscription information or a network condition, and reporting the determined access, will be described. However, the present disclosure may not be limited to the described embodiments, and it is apparent to those skilled in the art that modifications, which are based on the technical idea of the present disclosure, are possible in addition to the embodiments disclosed in the disclosure.

To describe embodiments of the present disclosure, descriptions will be provided mainly based on the case in which a network configuration includes a TWAN as a non-3GPP access network. However, the subject matter of the present disclosure may be applied to any cases where a PDN is utilized through the non-3GPP access network. That is, when an operator network configuration uses an untrusted WLAN, in embodiments of the present disclosure, the TWAN may be replaced with an ePDG, and the ePDG may be replaced with exchanging a message with a UE through the untrusted WLAN.

In the description of embodiments of the present disclosure, IP flow control information may include information for identifying an IP flow, and this may indicate all information that may be used for detecting a predetermined IP flow, such as Traffic Flow Templates (TFT), a packet filter, an IP flow descriptor, a Service Data Flow (SDF) Template, and the like.

In the present disclosure, the TWAN may be used along with the WLAN for convenience of description. Also, for ease of description, the WLAN may indicate an entity that executes control in the WLAN, for example, a WLAN Access Point (AP), a TWAG, or an ePDG. Also, for simplicity of description, the descriptions will be provided based on the case in which an entity that communicates with a UE is a TWAN. However, the entity that actually communicates with the UE based on a protocol of a message that the UE exchanges may be at least one element in the TWAN (that is, at least one of a WLAN access network, a TWAG, and a TWAP). For example, beacon messages may be transmitted by the WLAN access network within the TWAN. Also, an Access Network Query Protocol (ANQP) method may be applied between the UE and the WLAN access network in the TWAN, an ANQP server connected thereto, or the TWAG. Also, a WLAN control layer message (WLCP-WLAN Control Protocol) may be exchanged between the UE and the TWAG.

When the non-3GPP access network is an untrusted network, information exchanged between the UE and the ePDG may be included in an Internet Key Exchange (IKE) message, which is different from the WLAN control layer message, and may be transferred through the non-3GPP access network. When the UE directly exchanges information with the WLAN access network, an EAP message may be used.

Also, in the present disclosure, exchanging information between the WLAN and a policy and charging rules function (PCRF) will be described through Gateway Control Session establishment, modification, and termination, and exchanging information between a PGW and the PCRF will be described through IP-CAN Session establishment, modification, and termination. Actually, those processes may correspond to a process in which the WLAN or the PGW includes information described in embodiments of the present disclosure in a Credit Control Request (CCR) message and transmits the same to the PCRF, and the PCRF includes information described in embodiments of the present disclosure in a Credit Control Answer (CCA) message and transmits the same to the WLAN or the PGW.

When the PCRF transmits information described in embodiments of the present disclosure to the WLAN or the PGW without receiving a request, this may correspond to a process in which the PCRF includes information described in the embodiment of the present disclosure in a Re-Auth (RA) Request message, and transmits the same to the WLAN or the PGW, and the WLAN or the PGW that receives the same, includes information described in the embodiment of the present disclosure in a Re-Auth (RA) Answer message and provides a respond to the PCRF.

Also, when embodiments of the present disclosure are applied, a diameter message is not limited to the description, and may be used by being modified to another similar request/response message. The subject matter of the present disclosure is to transfer information described in embodiments of the present disclosure from an entity to another entity, and accordingly, to execute an operation described in embodiments of the present disclosure.

As described above, the descriptions in association with the embodiments of the present disclosure will be provided based on the case in which a UE is assigned with a single IP address simultaneously through a non-3GPP access network and a 3GPP access network. However, the subject matter of the present disclosure may be applied to the case in which the UE is assigned with different IP addresses for the non-3GPP access network and the 3GPP access network. In this instance, embodiments of the present disclosure may be applied when the UE has connections to an identical PGW, and information exchanged between the UE and each network entity may need to include information (an IP address, a connection identifier, an identifier of a basic bearer included in a connection, or the like) for identifying a connection which is a target of an operation.

However, in the descriptions of embodiments of the present disclosure, an SGW may be omitted during a message exchanging process in some cases. When a single network entity, particularly, an MME, exchanges a message with a PGW, the message may be exchanged with the PGW through the SGW. That is, the SWG may transfer control message received from the MME, to the PGW, and may transfer a message received from the PGW to the MME. In this instance, information (information element) included in a GPT message that is generated by the SGW and is transferred to a next hop may be information that is received from a previous hop.

Hereinafter, when the UE simultaneously accesses a 3GPP access network and a non-3GPP access network such as a WLAN, a method of determining a connection and a traffic path will be described in an embodiment.

Figure 3:
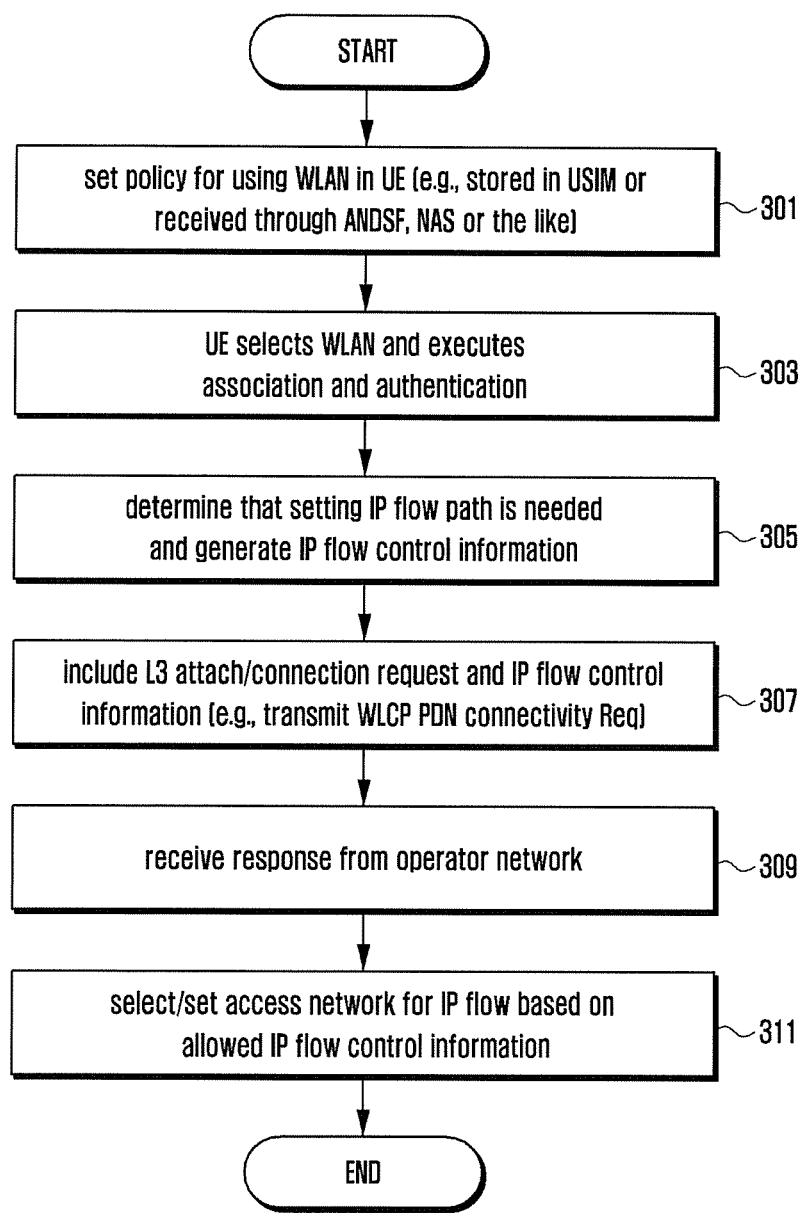
FIG. 3 illustrates a process in which a UE establishes a connection with a Wireless Local Area Network (WLAN), and updates traffic control information for transmitting or receiving traffic through LTE and the WLAN according to embodiments of the present disclosure.

FIG. 3 illustrates a process in which a UE establishes a connection with a WLAN, and updates traffic control information for transmitting or receiving traffic through LTE and the WLAN.

Referring to FIG. 3, the UE sets a policy for using the WLAN, in operation 301. The UE may have a policy (or a rule) for using the WLAN, and the policy may be stored in the UE or may be received from an ANDSF server, or may be received through an MME (using a NAS message) of an operator network or through an eNB (using an RRC message). The policy may include one or more pieces of information from among information for selecting the WLAN and information for determining an access network through which traffic is to be transmitted. Also, the policy may be stored in the UE and may include settings for reporting a WLAN state of an executed WLAN. In embodiments of the present disclosure, the settings for the WLAN state report may include at least one of a subject or an event of a report, a condition that requires a report, and a reporting period. In addition, information required for a WLAN operation may be additionally included in another embodiment. For example, the settings for WLAN state report may be set to execute reporting when a WLAN connection state of the UE is changed (that is, when connection establishment or termination or a measured signal strength satisfies a condition) or when the UE connects to a new WLAN. Also, the settings may be set to execute reporting a congestion state when a congestion state (a BSS load received from a beacon of an AP, a speed/load of a backhaul received through an ANQP process, an average delay time measured by a UE, or the like) of the WLAN that the UE accesses is greater than or equal to, or less than or equal to, a predetermined through value.

The UE may select the WLAN based on the policy or the rule, and execute access (association) and authentication processes, in operation 303. In embodiments of the present disclosure, the UE may omit the authentication process, and may execute the authentication process later on during a process where a connection is established.

The UE determines that setting a path for an IP flow based on the policy or the rule (that is, an access network to be used for transmitting an IP flow) is needed, and generates IP flow control information to be transmitted to a network, in operation 305.

The UE that accesses the WLAN transmits, to the operator network through the WLAN, a request message for establishing a connection in operation S307.

Depending on embodiments, the access of the UE and the establishment of the connection may be simultaneously executed. In various embodiments of the present disclosure, the request message may include a Layer 3 (L3) attach message. In various embodiments of the present disclosure, when the WLAN is a TWAN, the UE may transmit a WLCP PDN connectivity request message to the TWAG for requesting establishment of a connection, or to transmit an extensible authentication protocol (EAP) message to the WLAN. When the WLAN is an entrusted WLAN, the UE may transmit, to an ePDG, an IKE message for requesting establishment of a connection. The message may include at least one of a user identifier (IMSI or NAI), an Access Point Name (APN) of an AP with which a connection is to be established, a type of connection (attach or handover), and information indicating whether a UE supports a NW control-based IP flow mobility function. Also, the UE may include the IP flow control information generated in the previous processes, in the request message.

In various embodiments of the present disclosure, IP flow-based control information may be referred to as an IP flow descriptor. Here, the IP flow control information may correspond to a form of TFT of a packet filter. Particularly, the IP flow control information may include at least one of information for identifying an IP flow (a transceiving IP address, a transceiving port, a domain name, a protocol type, a service application identifier, and the like) and information for identifying an access network having a connection through which each IP flow is to be transmitted or received (for example, a connection through the WLAN or a connection through a 3GPP access network). Also, the IP flow control information may include a part or the entirety of an activated ANDSF policy (or rule).

When a response message includes the IP flow control information, the UE that receives the response message from the network in operation 309, may transmit an IP flow through a connection established based on the IP flow control information. When a PDN connection is established simultaneously through the WLAN and the 3GPP access network, the UE may determine an access network through which traffic is to be transmitted, based on the IP flow control information, in operation 311. Also, depending on embodiments of the present disclosure, the UE may select an access network through which traffic is to be transmitted, based on a value indicated by the IP flow control information.

In various embodiments of the present disclosure, the IP flow control information may include at least one of a priority of an access network for each IP flow and a condition used for selecting an access network for each IP flow. The condition may include at least one of a time, a location (geographic latitudinal/longitudinal position, a cell, a TA or the like), and a congestion state. In various embodiments of the present disclosure, the UE may select an access network through which an IP flow is to be transmitted, based on at least one of the priority and the condition. The priority may vary based on the condition. Particularly, in the case of a first position, the WLAN network has a high priority. In the case of a second position, the 3GPP network has a high priority.

When the IP flow control information includes the condition, the UE may select an access network that satisfies the condition included in the IP flow control information and has the highest priority, from among access networks through which a predetermined IP flow is to be transmitted, and transmit traffic through the selected access network.

When traffic transmission using an access network having a high priority fails due to a network condition (for example, when traffic of an IP flow with a high priority for the WLAN occurs and a connection with the WLAN is lost), the UE may transmit traffic through an access network having a subsequent priority.

In an embodiment of the present disclosure, the IP flow control information that the UE receives from the operator network may include a form of a policy (that is, a condition used when a UE makes a decision, and whether an operation succeeds or fails may not be reported to a network) or a command (a UE attempts to execute an operation based on a command and reports whether the operation succeeds or fails to a network). Also, in various embodiments of the present disclosure, an IP flow descriptor received from the operator network may include a condition or a rule used for transmission to a 3GPP network, or a condition or a rule used for transmission to a non-3GPP network.

When IP flow control information is not separately included in the response (accept) message, the UE recognizes that the request is accepted, and may set a path for an IP flow and execute controlling, in the same manner as the above described process, based on the IP flow control information that the UE inserted into the request message.

Figure 4:
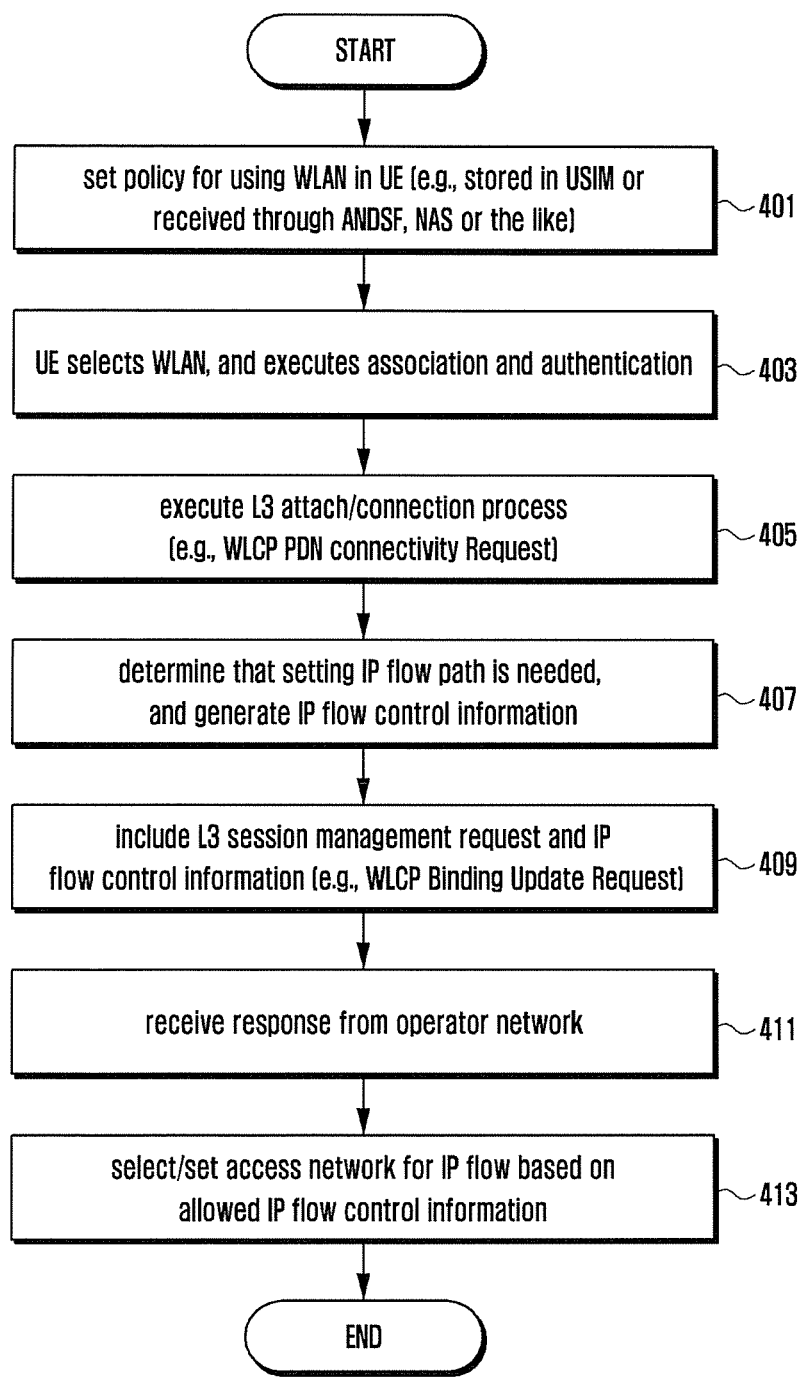
FIG. 4 illustrates a process in which a UE and a network establish a connection with a WLAN, and updates traffic control information for transmitting or receiving traffic through LTE and the WLAN according to embodiments of the present disclosure.

FIG. 4 illustrates a process in which a UE and a network establish a connection with a WLAN, and updates traffic control information for transmitting or receiving traffic through LTE and the WLAN. The difference from FIG. 3 is that a process of establishing a connection through the WLAN and a process of transmitting or receiving IP flow control information are separated.

Referring to FIG. 4, the UE sets a policy for using the WLAN, in operation 401. The UE may have a policy (or a rule) for using the WLAN, and the policy may be stored in the UE or may be received from an ANDSF server, or may be received through an MME (using a NAS message) of an operator network or through an eNB (using an RRC message). The policy may include one or more pieces of information from among information for selecting the WLAN and information for determining an access network through which traffic is to be transmitted. Also, the policy may be stored in the UE, and may include settings for reporting a WLAN state of an executed WLAN. In embodiments of the present disclosure, the settings for the WLAN state report may include at least one of a subject or an event of a report, a condition that requires a report, and a reporting period. In addition, information required for a WLAN operation may be additionally included in another embodiment. For example, the settings for WLAN state report may be set to execute reporting when a WLAN connection state of the UE is changed (that is, when connection establishment or termination or a measured signal strength satisfies a condition) or when the UE connects a new WLAN. Also, the settings may be set to execute reporting a congestion state when a congestion state of the WLAN that the UE accesses is greater than or equal to, or less than or equal to, a predetermined through value (a basic service set (BSS) load received from a beacon of an AP, a speed/load of a backhaul received through an ANQP process, an average delay time measured by a UE, or the like).

The UE may select the WLAN based on the policy or the rule, and execute access (association) and authentication processes, in operation 403. In embodiments of the present disclosure, the UE may omit the authentication process, and may execute the authentication process later on during a process where a connection is established.

The UE executes a process (attach or establishment of a PDN connection) for establishing a connection with a 3GPP core network through the WLAN, in operation 405. In this instance a request message that a user transmits to the network may be a WLCP PDN connectivity request. Also, in the process, the UE may set a basic rule in association with how the UE processes an IP flow through an established connection. In this instance, when the basic rule is included in a connection establishment accept (response) message received from the network, the UE may use the information and execute the setting process.

The UE determines that setting a path for an IP flow based on the policy or the rule (that is, an access network to be used for transmitting an IP flow) is needed, and generates IP flow control information to be transmitted to the network, in operation 407.

When IP flow controlling is required, the UE transmits a session management request message to the operator network in operation 409. In embodiments of the present disclosure, when the WLAN is a TWAN, the UE may transmit a WLCP binding update request message to the TWAG for requesting management of a session, or may transmit an EAP message to the WLAN. When the WLAN is an untrusted WLAN, the UE may transmit, to an ePDG, an IKE message for requesting management of a session. When session management is required through an E-UTRAN, the UE may use an ESM request message, for example, a binding update request or a bearer resource modification request message, which is transmitted to an MME. The message may include at least one of a user identifier (IMSI or NAI), an identifier (a connection ID, an IP address, or a bearer ID) for identifying a target connection, and information indicating whether a UE supports a NW control-based IP flow mobility function. Also, the UE may include IP flow control information generated in the previous processes, in the request message.

In various embodiments of the present disclosure, IP flow-based control information may be referred to as an IP flow descriptor. Here, the IP flow control information may correspond to a form of TFT of a packet filter. Particularly, the IP flow control information may include at least one of information for identifying an IP flow (a transceiving IP address, a transceiving port, a domain name, a protocol type, a service application identifier, and the like) and information for identifying an access network having a connection through which each IP flow is to be transmitted or received (for example, a connection through the WLAN or a connection through a 3GPP access network). Also, the IP flow control information may include a part or the entirety of an activated ANDSF policy (or rule).

When a response message includes the IP flow control information, the UE that receives the response message from the network in operation 411, may transmit an IP flow through a connection established based on the IP flow control information. When a PDN connection is established simultaneously through the WLAN and the 3GPP access network, the UE may determine an access network through which traffic is to be transmitted, based on the IP flow control information, in operation 413. Also, depending on embodiments of the present disclosure, the UE may select an access network through which traffic is to be transmitted, based on a value indicated by the IP flow control information.

In various embodiments of the present disclosure, the IP flow control information may include at least one of a priority of an access network for each IP flow and a condition used for selecting an access network for each IP flow. The condition may include at least one of a time, a location (geographic latitudinal/longitudinal position, a cell, a TA or the like), and a congestion state. In various embodiments of the present disclosure, the UE may select an access network through which an IP flow is to be transmitted, based on at least one of the priority and the condition. The priority may vary based on the condition. Particularly, in the case of a first position, the WLAN network has a high priority. In the case of a second position, the 3GPP network has a high priority.

When the IP flow control information includes the condition, the UE may select an access network that satisfies the condition included in the IP flow control information and has the highest priority, from among access networks through which a predetermined IP flow is to be transmitted, and transmit traffic through the selected access network.

When traffic transmission using an access network having a high priority fails due to a network condition (for example, when traffic of an IP flow with a high priority for the WLAN occurs and a connection with the WLAN is lost), the UE may transmit traffic through an access network having a subsequent priority.

In an embodiment of the present disclosure, the IP flow control information that the UE receives from the operator network may include a form of a policy (that is, a condition used when a UE makes a decision, and whether an operation succeeds or fails may not be reported to a network) or a command (a UE attempts to execute an operation based on a command and reports whether the operation succeeds or fails to a network). Also, in various embodiments of the present disclosure, an IP flow descriptor received from the operator network may include a condition or a rule used for transmission to a 3GPP network, or a condition or a rule used for transmission to a non-3GPP network.

When IP flow control information is not separately included in the response (accept) message, the UE recognizes that the request is accepted, and may determine a path for an IP flow and execute controlling in the same manner as the above described process, based on the IP flow control information that the UE inserted into the request message.

Figure 5:
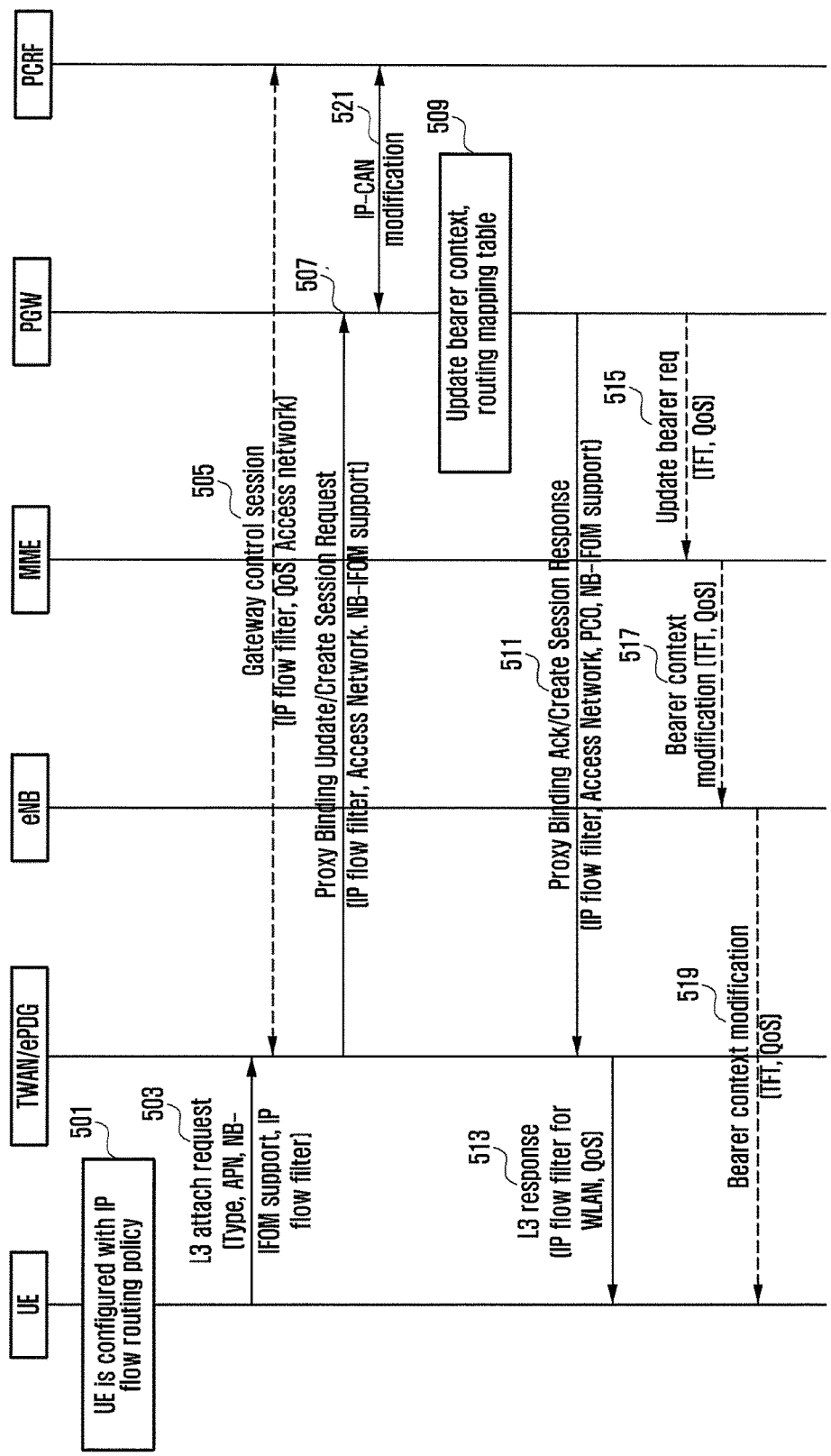
FIG. 5 illustrates a process in which a UE and a network establish a connection with a WLAN, and updates traffic control information for transmitting or receiving traffic through LTE and the WLAN according to embodiments of the present disclosure.

FIG. 5 illustrates a process in which a UE and a network establish a connection with a WLAN, and updates traffic control information for transmitting or receiving traffic through LTE and the WLAN.

Referring to FIG. 5, a signal may be transmitted or received between at least two entities from among a UE, a TWAN/ePDG, an eNB, an MME, a PGW, and a PCRF.

A policy (or a rule) may be set for the UE, which is used to select the WLAN or to determine an IP flow to be transmitted through an access network having a connection, in operation 501. Generally, the policy is set after being generated through a policy server, for example, an ANDSF server, and transferred to the UE. The policy may be set or stored in advance in the UE without interoperation with an external entity. The UE may select the WLAN based on the policy, and may execute access (association) and authentication processes.

The UE may transmit an attach request to the TWAN/ePDG through the WLAN network, in operation 503. In this instance, based on a network configuration, a WLCP (in the case of a multi-connection mode in a Trusted WLAN), a DHCP (it is set to use a DHCP), an EAP (in the case of a single connection mode in a Trusted WLAN), or an IKE request message (in the case of an Untrusted WLAN) may be used. Particularly, when the WLCP is used, the request message may be a PDN connectivity request message. The messages may include at least one of information indicating whether a UE supports NW-based IP flow mobility and NW-based IP flow control related information (IP flow filter). The IP flow control information may include a packet filter for identifying an IP flow and an identifier indicating an allowable access network for the corresponding IP flow. Alternatively, the IP flow control information may include IP flow identification information, an application condition (a time, a position, a congestion state, or the like), and priorities of access networks for each condition, by introducing a selection condition for an access network and a priority for selecting an access network. Also, the IP flow control information may include QoS information for each IP flow, for example, a type of traffic (VoIP, Video, Best effort, or the like), an uplink/downlink maximum/minimum/secured bit rate, a QCI/ARP, or a transmission parameter used in the WLAN, for example, an Access Category index or the like. The UE may include all the activated parts of the set policy (for example, the policy that is received from the ANDSF and is set) in the IP flow control information, or may extract a policy associated with traffic, which is the subject of the current IP flow movement and includes the same in the IP flow control information.

When each entity executes a connection (Gx interface) with a PCRF, the TWAN (in the case of a Trusted WLAN) or an ePDG (in the case of an Untrusted WLAN), that receives a connection (or attach) request message transmitted from the UE, may execute establishment/modification of a gateway control session with the PCRF, in operation 505. In this instance, the PCRF may receive one or more pieces of information from among an ID of the UE, an ID of the WLAN, a WLAN connection state, a requested APN, and information indicating whether NW-based IP flow mobility is supported. WLAN state information may include a WLAN connection state of a UE and a congestion state of a WLAN that a UE accesses (a BSS load, the number of connected stations, a speed/load of a backhaul, an average delay time, or the like). The PCRF that receives the WLAN state information may determine offloading with respect to the UE (that is, determine whether to execute WLAN offloading or determine traffic to be transmitted through the WLAN), by taking into consideration the WLAN state information.

Also, the TWAN/ePDG may transfer, to the PCRF, the IP flow control information received from the UE. The PCRF determines whether to allow IP flow controlling, based on user subscription information (received from an SPR or the like), and transmits, to the TWAN or the ePDG, information (hereinafter referred to as IP flow control information) for determining an access network for each IP flow based on a condition of an operator network (a congestion state of an LTE network, a congestion state of the WLAN, or the like). The IP flow control information may include a packet filter for identifying an IP flow and an identifier indicating an allowable access network for the corresponding IP flow. Alternatively, the IP flow control information may include IP flow identification information, an application condition (a time, a position, a congestion state, or the like), and priorities of access networks for each condition, by introducing a selection condition for an access network and a priority for selecting an access network. Also, the IP flow control information may include QoS information for each IP flow, for example, a type of traffic (VoIP, Video, Best effort, or the like), an uplink/downlink maximum/minimum/secured bit rate, a QCI/ARP, or a transmission parameter used in the WLAN, for example, an Access Category index or the like. Also, the PCRF may transfer, to a core network, information indicating whether WLAN offloading with respect to the UE is allowed for each APN or each bearer.

The TWAN/ePDG transmits, to the PGW, a Proxy Binding Update message (in the case of a PMIP) or a Create Session Request message (in the case of a GTP), in operation 507. The request message may include at least one of IP flow control information and QoS information, received from the UE, in addition to basic information. Alternatively, the request message may include IP flow control information and QoS information, received from the PCRF. Also, the request message may include WLAN state information. The WLAN state information may include a WLAN connection state of a UE and a congestion state of a WLAN that a UE accesses (a BSS load, the number of connected stations, a speed/load of a backhaul, an average delay time, or the like).

The PGW that receives the WLAN state information may determine offloading with respect to the UE (that is, determine whether to execute WLAN offloading or determine traffic to be transmitted through the WLAN), by taking into consideration the WLAN state information.

The PGW may generate/update a PGW context associated with the UE, based on the information received from the TWAN/ePDG in operation 509, and may determine an access network through which downlink data is to be transmitted for each IP flow based on the PGW context.

Also, the PGW may determine a QoS parameter to be applied for controlling traffic. When a PDN connection is established already through an E-UTRAN, the PGW may identify an IP flow that is to be transmitted or received to the E-UTRAN based on the information, and may update a routing table and a bearer context of the E-UTRAN (that is, TFT or a packet filter). The updated information may include priorities of access networks for each traffic, and information associated with a part or the entirety of traffic transmitted through a 3GPP network and traffic transmitted through a non-3GPP network. Also, the updated information may include IP filter related information.

The PGW transmits, to the TWAN or the ePDG, a Proxy Binding Acknowledgement message (in the case of a PMIP) or Create Session Response message (in the case of a GTP) including information associated with an IP flow that is to be transmitted or received through the WLAN, based on the above determination, in operation 511. When the IP flow control information is needed to be transferred to the UE through a PCO, the PGW may include the IP flow control information in the PCO and transmit the response message to the TWAN/ePDG, and the TWAN/ePDG that receive the same may transfer the PCO part to the UE. When the QoS control information is included in the IP flow control information, the TWAN/ePDG transfers the QoS control information through the WLAN so as to configure a traffic transmission parameter for each traffic.

The TWAN/ePDG transfers, to the UE, the IP flow control information received from the PGW, in operation 513. The UE that receives the same may determine IP flows to be transmitted or received through the WLAN. When the QoS control information is included in the IP flow control information, the UE may configure a traffic transmission parameter corresponding to an IP flow.

Alternatively, the TWAN/ePDG may transmit, to the UE, merely a message indicating that a request of the UE is allowed. In this instance, the UE recognizes that the use of the IP flow control information that the UE included in the request message is allowed, and may select a path and execute controlling in association with an IP flow.

When a connection to the WLAN is added/terminated, or when an IP flow to be transmitted or received through the E-UTRAN is changed as an IP flow path is set to the WLAN (that is, a few IP flows need to be preferentially transmitted or not transmitted through the E-UTRAN), controlling thereof may be executed by exchanging a message between the TWAN/ePDG and the UE, in operations 515, 517, and 519. That is, when information associated with an access network to be selected for each traffic is included in the IP flow control information that is transferred to the UE, the UE updates a TFT for the WLAN or a packet filter, based on the information received from the TWAN/ePDG, and simultaneously, updates a bearer context of the E-UTRAN by transferring a TFT of a bearer used in the E-UTRAN or a packet filter through a NAS of a 3GPP modem. In this instance, to reduce a burden for the UE that processes a TFT or a packet filter by itself, the IP flow control information that is generated from the PGW and is transferred to the UE may include the entirety of an ESM message (for example, a Bearer Resource Modification Request) used for updating a TFT or a packet filter in the NAS or may include merely a TFT or a packet filter to be updated for each bearer. When a message including the IP flow control information, received through the WLAN, includes the ESM message, the UE transfers the ESM message to a controller that processes a 3GPP NAS and the 3GPP NAS controller that receives the same may process the ESM message. In the process, a context of the 3GPP NAS layer of the UE may be changed, or an ESM response message thereto, or a new ESM request message may be generated and transmitted.

When the method is not applied, the PGW may change a bearer context of the E-UTRAN side through the E-UTRAN, that is, a TFT or a packet filter. To this end, a P-GW initiated bearer modification process may be executed in operation 521. Each message may include TFT information and QoS information.

When the process associated with embodiments of the present disclosure is completed, the PGW may be aware of an access network through which each downlink IP flow is to be transmitted, and the UE may determine an access network for each uplink IP flow and execute transmission. Also, the UE may be aware of a QoS parameter to be applied when traffics are transmitted, and may select an access network or may determine a transmission priority based on the QoS parameter.

Although the embodiment of the present disclosure describes that the UE transfers IP flow control information to a network when the UE is attached through the WLAN network or in the process of a PDN connection, in another embodiment of the present disclosure, an attach/PDN connection establishment process and a process of setting a traffic transmission path (that is, a target access network) by exchanging IP flow control information may be separated and sequentially executed.

Figure 6:
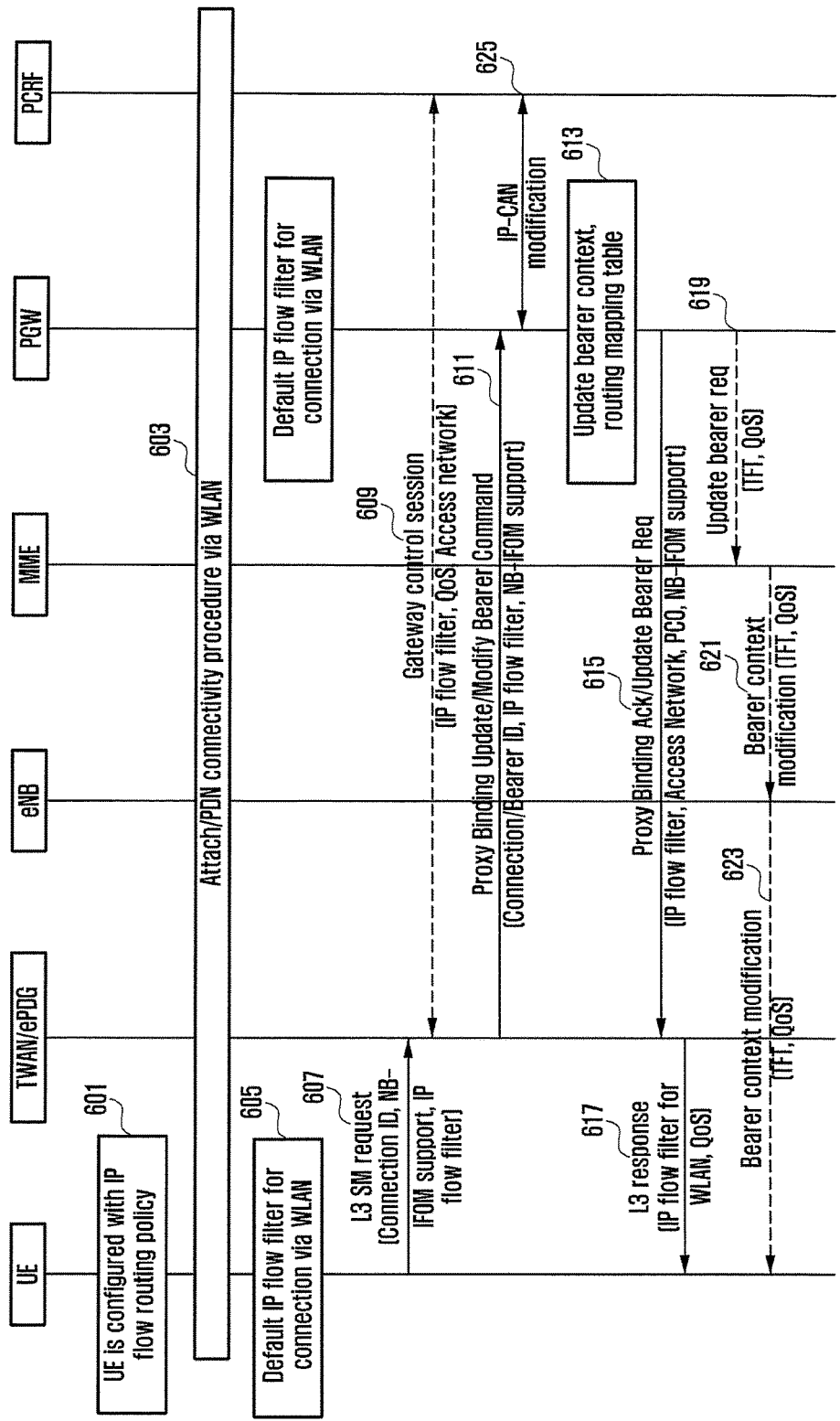
FIG. 6 illustrates a method in which a UE establishes a connection through a WLAN, and exchanges IP flow control information with a core network, so as to set a traffic transmission path according to embodiments of the present disclosure.

FIG. 6 illustrates a method in which a UE establishes a connection through a WLAN and exchanges IP flow control information with a core network, so as to set a traffic transmission path.

Referring to FIG. 6, a signal may be transmitted or received between at least two entities from among a UE, a TWAN/ePDG, an eNB, an MME, a PGW, and a PCRF.

A policy (or a rule) may be set for the UE, which is used to select a WLAN or to determine an IP flow to be transmitted through an access network having a connection, in operation 601. Generally, the policy is set after being generated through a policy server, for example, an ANDSF server, and transferred to the UE. The policy may be set or stored in advance in the UE without interoperation with an external entity.

The UE may select the WLAN based on the policy, and may execute access (association) and authentication processes. The UE may execute an attach process or establishment of a PDN connection through the WLAN network, in operation 603.

Upon completion of the process, the UE may need to set how the UE exchanges data through the established connection. To this end, the UE may set default IP flow control information, in operation 605. The default IP flow control information may be explicitly transmitted to the UE in the process of establishing a connection with the network. Otherwise, the default IP flow control information may be set in advance in the UE. The default IP flow control information may include IP flow control information that may set transmission or reception of all traffic through a connection established through the WLAN to not be allowed, or may set transmission or reception of a part or the entirety of traffic to be allowed but to have a priority lower than the E-UTRAN.

The UE may transmit a session management request message for setting a path for a predetermined IP flow, in operation 607. In this instance, based on a network configuration, a WLCP (in the case of a multi-connection mode in a Trusted WLAN), a DHCP (it is set to use a DHCP), an EAP (in the case of single connection mode in a Trusted WLAN), an IKE request message (in the case of an Untrusted WLAN) may be used. Particularly, when the WLCP is used, the request message may be a binding update request message. The messages may include at least one of an identifier (a connection ID or an IP address) for identifying a target connection, information indicating whether a UE supports NW-based IP flow mobility, and NW-based IP flow control related information (IP flow filter). The IP flow control information may include a packet filter for identifying an IP flow and an identifier indicating an access network for the corresponding IP flow. Alternatively, the IP flow control information may include IP flow identification information, an application condition (a time, a position, a congestion state, or the like), and priorities of access networks for each condition, by introducing a selection condition for an access network and a priority for selecting an access network, Also, the IP flow control information may include QoS information for each IP flow, for example, a type of traffic (VoIP, Video, Best effort, or the like), an uplink/downlink maximum/minimum/secured bit rate, a QCI/ARP, or a transmission parameter used in the WLAN, for example, an Access Category index or the like. The UE may include all the activated part of the set policy (for example, the policy that is received from the ANDSF and is set) in the IP flow control information, or may extract a policy corresponding to traffic which is the subject of the current IP flow movement and include the same in the IP flow control information.

When each entity executes a connection (Gx interface) with a PCRF, the TWAN (in the case of a Trusted WLAN) or an ePDG (in the case of an Untrusted WLAN), that receives a connection (or attach) request message transmitted from the UE, may execute establishment/modification of a gateway control session with the PCRF, in operation 609. In this instance, the PCRF may receive one or more pieces of information from among an ID of the UE, an ID of the WLAN, a WLAN connection state, a requested APN, and information indicating whether NW-based IP flow mobility is supported. WLAN state information may include a WLAN connection state of a UE and a congestion state of a WLAN that a UE accesses (a BSS load, the number of connected stations, a speed/load of a backhaul, an average delay time, or the like). The PCRF that receives the WLAN state information may determine offloading with respect to the UE (that is, determine whether to execute WLAN offloading or determine traffic to be transmitted through the WLAN), by taking into consideration the WLAN state information.

Also, the TWAN/ePDG may transfer, to the PCRF, the IP flow control information received from the UE. The PCRF determines whether to allow IP flow controlling, based on user subscription information (received from an SPR or the like), and transmits, to the TWAN or the ePDG, information (hereinafter referred to as IP flow control information) for determining an access network for each IP flow based on a condition of an operator network (a congestion state of an LTE network, a congestion state of the WLAN, or the like). The IP flow control information may include information (a packet filter) for identifying an IP flow and an identifier indicating an allowable access network for the corresponding IP flow. Alternatively, the IP flow control information may include IP flow identification information, an application condition (a time, a position, a congestion state, or the like), and priorities of access networks for each condition, by introducing a selection condition for an access network and a priority for selecting an access network. Also, the IP flow control information may include QoS information for each IP flow, for example, a type of traffic (VoIP, Video, Best effort, or the like), an uplink/downlink maximum/minimum/secured bit rate, a QCI/ARP, or a transmission parameter used in the WLAN, for example, an Access Category index or the like. Also, the PCRF may transfer, to a core network, information indicating whether WLAN offloading with respect to the UE is allowed for each APN or each bearer.

The TWAN/ePDG transmits, to the PGW, a Proxy Binding Update message (in the case of a PMIP) or a Modify Bearer Command message (in the case of a GTP), in operation 611. The message may include at least one of an identifier (a connection ID, an IP address, or a Bearer ID) for identifying a connection, IP flow control information received from the UE, and QoS information, in addition to basic information. Alternatively, the message may include IP flow control information and QoS information, received from the PCRF. Also, the message may include WLAN state information. The WLAN state information may include a WLAN connection state of a UE and a congestion state of a WLAN that a UE accesses (a BSS load, the number of connected stations, a speed/load of a backhaul, an average delay time, or the like).

The PGW that receives the WLAN state information may determine offloading with respect to the UE (that is, determine whether to execute WLAN offloading or determine traffic to be transmitted through the WLAN), by taking into consideration the WLAN state information.

The PGW may generate/update a PGW context associated with the UE, based on the information received from the TWAN/ePDG in operation 613, and may determine an access network through which downlink data is to be transmitted for each IP flow based on the PGW context.

Also, the PGW may determine a QoS parameter to be applied for controlling traffic. When a PDN connection is established already through an E-UTRAN, the PGW may identify an IP flow that is to be transmitted or received to the E-UTRAN based on the information, and may update a routing table and a bearer context of the E-UTRAN (that is, a TFT or a packet filter). The updated information may include priorities of access networks for each traffic, and information associated with a part or the entirety of traffic transmitted through a 3GPP network and traffic transmitted through a non-3GPP network. Also, the updated information may include IP filter related information.

The PGW transmits, to the TWAN or the ePDG, a Proxy Binding Acknowledgement message (in the case of a PMIP) or an Update Bearer Request message (in the case of a GTP) including information associated with an IP flow that is to be transmitted or received through the WLAN, based on the above determination. When the IP flow control information is needed to be transferred to the UE through a PCO, the PGW may include the IP flow control information in the PCO and transmit the response message to the TWAN/ePDG, and the TWAN/ePDG that receive the same may transfer the PCO part to the UE. When the QoS control information is included in the IP flow control information, the TWAN/ePDG transfers the QoS control information through the WLAN so as to set a traffic transmission parameter for each traffic.

The TWAN/ePDG transfers, to the UE, IP flow control information received from the PGW, in operation 617. The UE that receives the same may determine IP flows to be transmitted or received through the WLAN. When the QoS control information is included in the IP flow control information, the UE may set a traffic transmission parameter corresponding to an IP flow.

Alternatively, the TWAN/ePDG may transmit, to the UE, merely a message indicating that a request of the UE is allowed. In this instance, the UE recognizes that the use of the IP flow control information that the UE included in the request message is allowed, and may select a path and execute controlling in association with an IP flow.

When a connection to the WLAN is added/terminated, or when an IP flow to be transmitted or received through the E-UTRAN is changed as an IP flow path is set to the WLAN (that is, a few IP flows need to be preferentially transmitted or not transmitted through the E-UTRAN), controlling thereof may be executed by exchanging a message between the TWAN/ePDG and the UE, in operations 619, 621, and 623. That is, when information associated with an access network to be selected for each traffic is included in the IP flow control information that is transferred to the UE, the UE updates a TFT for the WLAN or a packet filter, based on information received from the TWAN/ePDG, and simultaneously, updates a bearer context of the E-UTRAN by transferring a TFT of a bearer used in the E-UTRAN or a packet filter through a NAS of a 3GPP modem. In this instance, to reduce a burden for the UE that processes the TFT or the packet filter by itself, the IP flow control information that is generated from the PGW and is transferred to the UE may include the entirety of an ESM message (for example, a Bearer Resource Modification Request) used for updating a TFT or a packet filter in the NAS or may include merely a TFT or a packet filter to be updated for each bearer. When a message including the IP flow control information, received through the WLAN includes the ESM message, the UE transfers the ESM message to a controller that processes a 3GPP NAS and the 3GPP NAS controller that receives the same may process the ESM message. In the process, a context of the 3GPP NAS layer of the UE may be changed, or an ESM response message thereto, or a new ESM request message may be generated and transmitted.

When the method is not applied, the PGW may change a bearer context of the E-UTRAN side through the E-UTRAN, that is, a TFT or a packet filter. To this end, a P-GW initiated bearer modification process may be executed in operation 625. Each message may include TFT information and QoS information.

When the process associated with embodiments of the present disclosure is completed, the PGW may be aware of an access network through which each downlink IP flow is to be transmitted, and the UE may determine an access network for each uplink IP flow and execute transmission. Also, the UE may be aware of a QoS parameter to be applied when traffics are transmitted, and may select an access network and may determine a transmission priority based on the QoS parameter.

When the UE simultaneously accesses the 3GPP access network (E-UTRAN/LTE) and the non-3GPP access network (WLAN) and have connections, a user may select a preferred access network for transmitting or receiving data. Particularly, when a size of data to be transmitted is large or requires predetermined QoS requirements, an access network appropriate thereto needs to be selected for data transmission and thus, the quality of service that the user experiences may be improved. Here, the service that the user may receive may be a Rich Communication Suit (RCS). Particularly, the service may correspond to the case in which a user selects media file or file transmission from among the RCS services.

Figure 7:
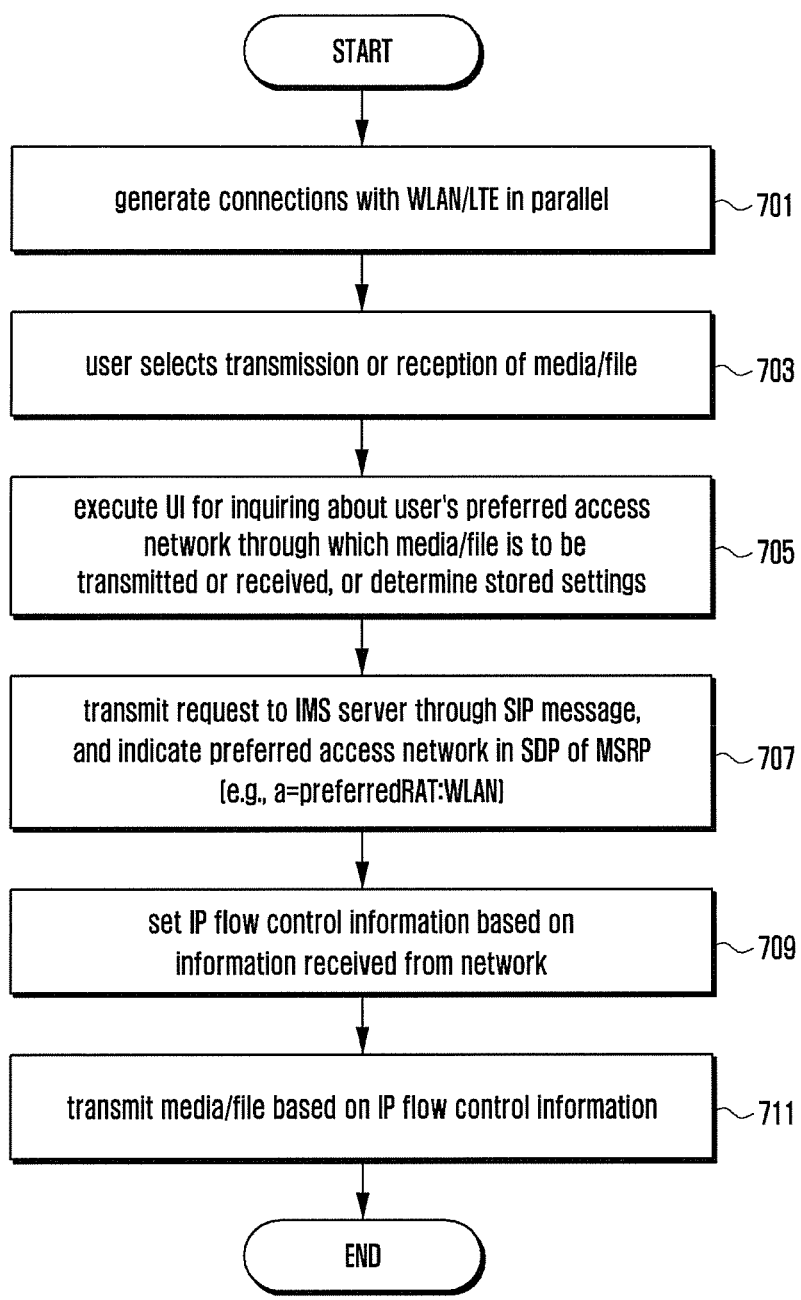
FIG. 7 illustrates a process of selecting an access network to be used for transmitting or receiving data through an established session when a new session needs to be established for a UE according to embodiments of the present disclosure.

FIG. 7 illustrates a method of selecting an access network to be used for transmitting or receiving data through an established session when a new session needs to be established for a UE.

Referring to FIG. 7, the UE are simultaneously connected with a WLAN and LTE, and a PDN connection may be established through the WLAN and LTE, in operation 701. The UE is registered on an IP Multimedia Subsystem (IMS) network through the PDN connection, and also, may receive a Rich Communication Suit (RCS) service.

A user may select media file or file transmission through the UE, in operation 703. Although, for ease of description, embodiments of the present disclosure describes a media file or a file as an example, the present disclosure may not be limited to the media file or file transmission, and may be applied to any type of data.

The UE may output a screen for inquiring about user's preferred access network from among access networks through which a media file or a file is to be transmitted or received, in operation 705. When the user selects or inputs a preferred access network, the UE may recognize the same. Alternatively, when a preferred access network for transmitting or receiving a media file or a file is set in advance by the user, the UE may determine the access network preferred by the user based on setting information.

The UE may transfer, to a server through a control message, information for beginning media file or file transmission, in operation 707. The control message may be a Session Initiation Protocol (SIP) message, and the server may be a server that supports an IMS. The control message may include information indicating an access network (Radio Access Technology (RAT)) preferred when the UE executes media file or file transmission. In embodiments of the present disclosure, the SIP message may be an INVITE message. Also, in embodiments of the present disclosure, the SIP message may include Message Session Relay Protocol (MSRP) session information for creating a session for media file or file transmission. Also, in embodiments of the present disclosure, the preferred access network information may be an identifier indicating one of WLAN, 3GPP, E-UTRAN, UTRAN, and GERAN. Also, in embodiments of the present disclosure, the preferred access network information may be included as a part of a Session Description Protocol (SDP). In the case where the SDP is used, for example, when the preferred access network is the WLAN, the preferred access network information may be encoded into a form of "a=preferredRAT:WLAN." When an MSRP is used, the SDP information indicating the preferred access network may be included as a part of the SDP for the MSRP.

In response to the request, the UE may receive IP flow control information from an operator network in operation 709, and accordingly, the UE may determine an access network through which a new session for media file or file transmission is to be transmitted.

The UE may transmit or receive a media file or a file through the selected access network, based on the settings, in operation 711.

Figure 8:
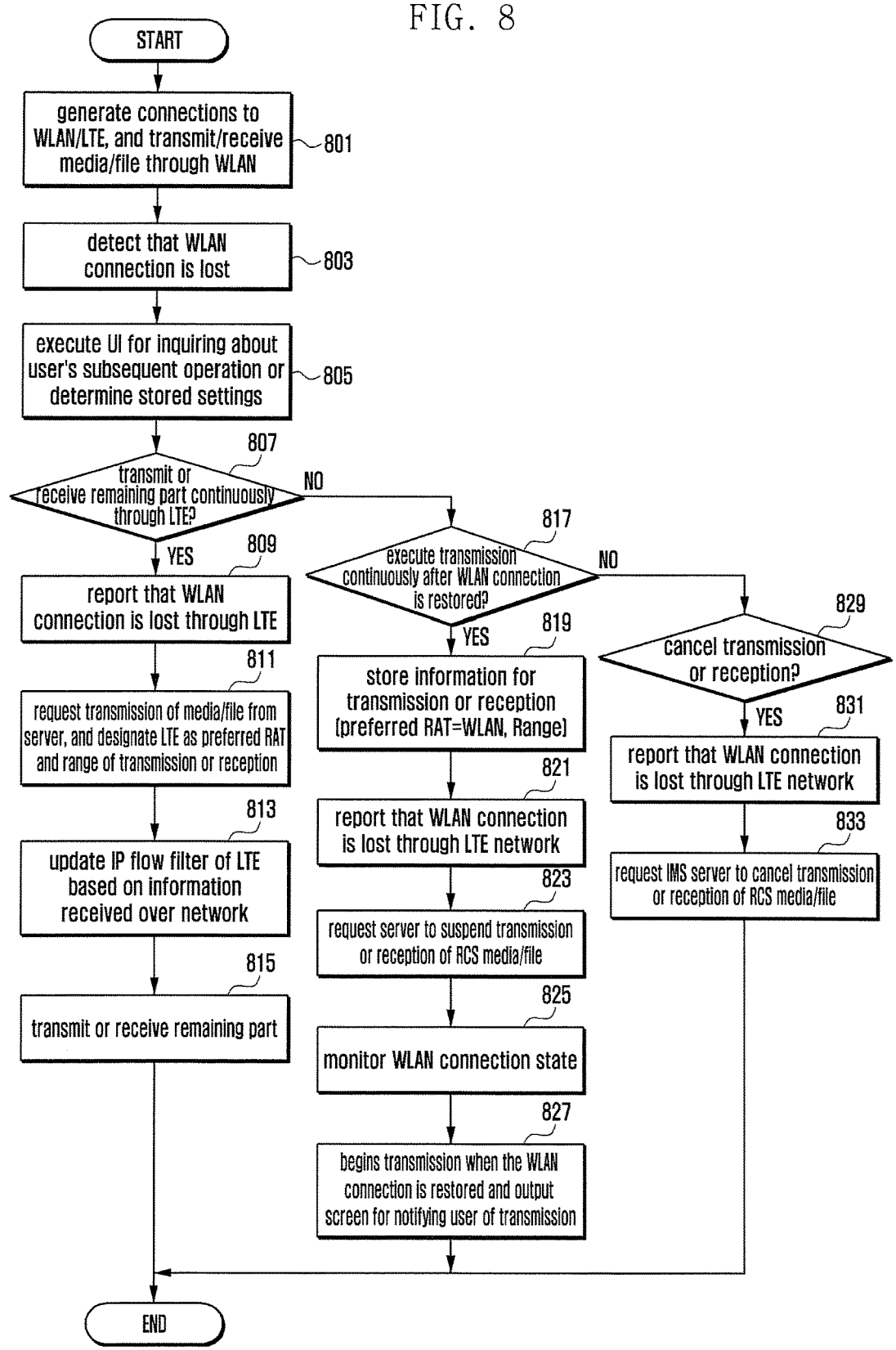
FIG. 8 illustrates operations executed when a UE executes transmission by selecting an access network with respect to a predetermined session and a connection to the corresponding access network is lost before the transmission is completed according to embodiments of the present disclosure.

FIG. 8 illustrates operations executed when a UE executes transmission by selecting an access network with respect to a predetermined session and a connection to the corresponding access network is lost before the transmission is completed.

Referring to FIG. 8, the UE are simultaneously connected with a WLAN and LTE, and a PDN connection may be established through the WLAN and LTE, in operation 801. The UE is registered on an IMS through the PDN connection, and also, may receive a Rich Communication Suit (RCS) service. In FIG. 8, the UE transmits or receives a media file or a file through the PDN connection, and descriptions are provided by assuming the case where the WLAN is used for the transmission and reception. Although, for ease of description, embodiments of the present disclosure describes a media file or a file as an example, the present disclosure may not be limited to the media file or file transmission, and may be applied to any type of data.

The UE detects that the connection with the WLAN is lost before the media file or file transmission is completed, in operation 803.

The UE may output a screen for informing a user that the transmission is uncompleted and the connection with the WLAN is lost. Also, the UE may output a screen for reporting a size of the part of which transmission or reception is completed out of the entire media/file. Also, the UE may output a screen for inquiring about user's preferred subsequent operation for media file or file transmission, in operation 805. Here, subsequent operations that the UE may execute may include the following operations: (i) continuously execute transmission or reception of remaining part through LTE (operation 807), (ii) retry transmission or reception when connection with WLAN is restored (operation 817), or (iii) cancel transmission or reception (operation 829).

When the user selects a preferred subsequent operation of the UE, the UE may recognize the same. Alternatively, when the user sets an operation preferred for the situation in advance, the UE recognizes the set subsequent operation based on setting information.

When the user selects continuously executing transmission or reception of the remaining part through LTE, or it is set to execute the same, the UE may execute operations 809 to 815.

Hereinafter, operations when the user executes transmission or reception remaining part through LTE will be described in detail.

The UE may optionally report that a connection with the WLAN is lost through an LTE network, in operation 809.

The UE may transfer, to a server through a control message, information for beginning media file or file transmission, in operation 811. The control message may be an SIP message, and the server may be a server that supports an IMS. The control message may include information indicating an access network (Radio Access Technology (RAT)) preferred when the UE executes media file or file transmission. In the present embodiment, the preferred access network may be LTE or E-UTRAN.

Also, the control message may include information indicating a range of a part of a media file/file to be transmitted or received subsequently. In embodiments of the present disclosure, the SIP message may be an INVITE message. Also, in embodiments of the present disclosure, the SIP message may include Message Session Relay Protocol (MSRP) session information for creating a session for media file or file transmission. Also, in embodiments of the present disclosure, the preferred access network information may be included as a part of a Session Description Protocol (SDP). When the SDP is used, the preferred access network information may be encoded into a form of "a=PreferredRAT:E-UTRAN," a range of a media file to be transmitted or received may be encoded in a form of "a=Range:bytes=A-B," and A indicates a starting point of a part to be transmitted or received and B indicates a ending point. When the MSRP is used, the SDP information indicating the preferred access network or the range may be included as a part of the SDP for the MSRP.

In response to the request, the UE may receive IP flow control information from an operator network, and accordingly, the UE may determine an access network through which a new session for media file or file transmission is to be transmitted, in operation 813.

The UE may transmit or receive a media file or a file through the selected access network, based on the settings, in operation 815.

In operation 807, when the user selects retrying transmission or reception after the WLAN connection is restored or it is set to execute the same, as opposed to continuously executing transmission or reception of remaining part through LTE, the UE executes operations 819 to 827.

The UE may store information for transmitting or receiving the remaining part of the media file/file automatically after the WLAN connection is restored in operation 819. The information may include information indicating that a preferred access network for transmitting the media file/file is the WLAN, and information indicating a part of which transmission or reception is completed out of the entire media file/file or information indicating a part that is to be transmitted or received subsequently.

The UE may optionally report that a connection with the WLAN is lost through the LTE network, in operation 821.

Also, the UE may optionally transmit, to the server, a message indicating that the media/file transmission is suspended, in operation 823. The message may be an SIP message, and the server may be an IMS server. Also, the SIP message may be a BYE message. As described above, the message may include information indicating that a preferred access network for transmitting the media file/file is the WLAN and information indicating a part of which transmission or reception is completed out of the entire media/file or information indicating a part (range) that is to be transmitted or received subsequently.

The UE may monitor a WLAN connection state in operation 825. The monitoring may be executed through a module (for example, an RCS client) that processes the media file/file transmission or reception, by periodically calling an API that provides WLAN connection state information or subscribing for a notification association with the WLAN connection state.

When the WLAN connection is restored, the UE executes an operation for restarting media file/file transmission. In this instance, operation 827 may be applied, and information indicating that a preferred access network is the WLAN and a range for transmission or reception is the remaining part of the media file/file, may be included.

In operation 807 and 817, the user selects a transmission cancellation operation as opposed to transmitting the remaining part through LTE or the WLAN, or it is set to execute the same, the UE may execute operations 829 to 833.

The UE may optionally report that a connection with the WLAN is lost through the LTE network, in operation 831.

Also, the UE may optionally transmit, to the server, a message indicating that the media/file transmission is cancelled, in operation 833. The message may be an SIP message, and the server may be an IMS server. Also, the SIP message may be a BYE message.

Figure 9:
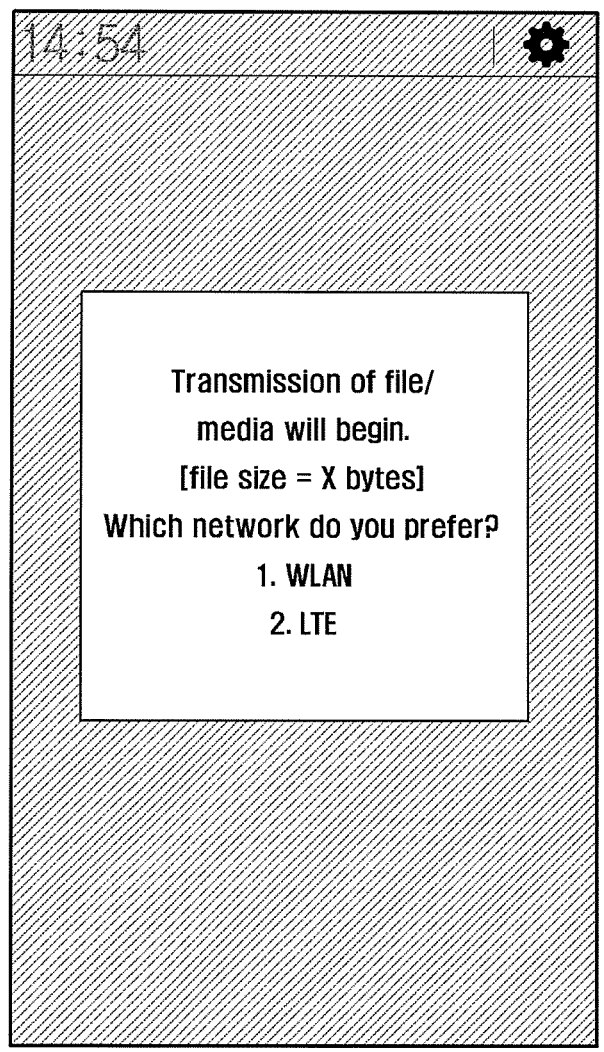
FIG. 9 illustrates a User Interface (UI) that inquires about a preference for an access network through which a media file or a file is to be transmitted when new media file or file transmission occurs according to embodiments of the present disclosure.

FIG. 9 illustrates a User Interface (UI) that inquires about a preference for an access network through which a media file or a file is to be transmitted, when new media file or file transmission occurs.

Referring to FIG. 9, when media file or file transmission (transmission or reception) begins, a UE provides transmission information to a user, and may output a screen inquiring about user's preference. Transmission information shown to the user may include a size of a file (bits or bytes) or a format of file (AVI, MP2, MP4 or the like), or a list of currently connectable access networks (connectable access networks such as WLAN, LTE, 3G, or the like) to enable the user to select one of them. When the user selects an access network, the UE may memorize a type of the selected access network and transfer the information to a lower layer (a NAS that controls a 3GPP modem and a WLCP that manages the WLAN), or a connection manager module that manages a connection in the UE. In embodiments of the present disclosure, the operation and processing may be executed in an RCS client SW. In this instance, to transfer the information to another layer or a module of the UE, a predetermined Application Programming Interface (API) may be called or utilized.

Also, although not illustrated, an item for cancelling file transmission may be added to a UI, so that the user may select cancellation of file transmission.

Figure 10:
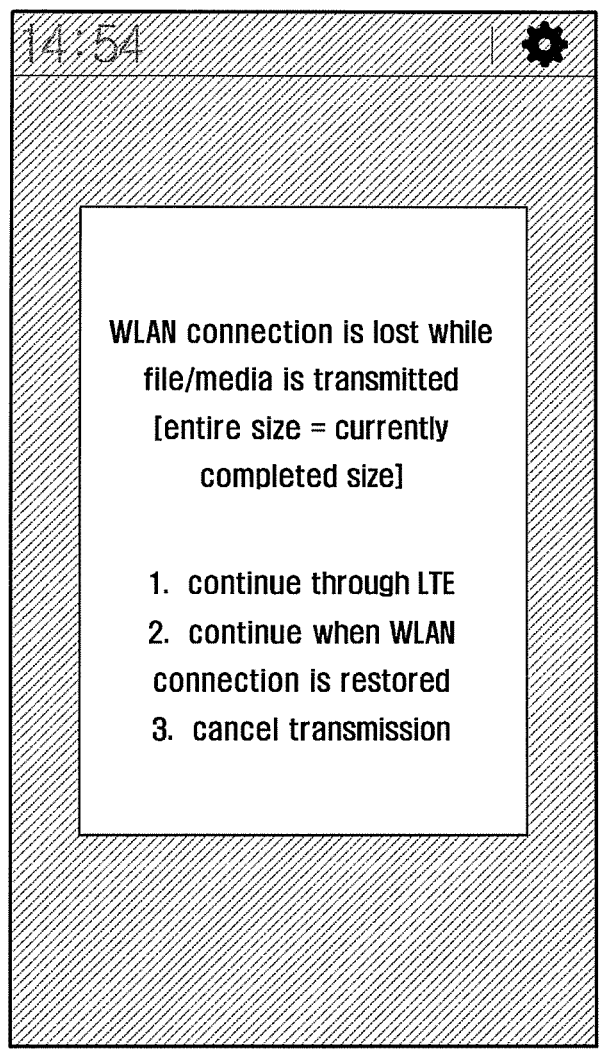
FIG. 10 illustrates a UI that inquires about a subsequent operation that a user prefers when a connection to an access network through which a media file or file has been transmitted/received is terminated according to embodiments of the present disclosure.

FIG. 10 illustrates a UI that inquires about a subsequent operation that a user prefers when a connection of an access network through which a media file or file has been transmitted/received is terminated.

Referring to FIG. 10, when a connection with an access network that has been used for transmission is terminated while media file or file transmission (transmission or reception) is executed, a UE provides transmission information to a user, and may output a screen inquiring about user's preference. Transmission information shown to the user may include a size of the entire media file or file (bits or bytes), a size of a media file or file of which transmission is completed up to the present or a size of a media file or file that remains for transmission, and a format of a media file or file (AVI, MP3, MP4, or the like), and may show operations that the UE may execute subsequently so as to enable the user to select one of them. Here, the subsequent operations that the user may select may be one of the following items: (1.) Continuously execute transmission through LTE (or a cellular data connection such as 3G or the like); (2.) Execute transmission when WiFi connection is restored (reserved transmission); or (3.) Cancel transmission.

When the user selects an operation, the UE may memorize the selected operation, and transfer the information to a lower layer (a NAS that controls a 3GPP modem and a WLCP that manages the WLAN) or a connection manager module that manages a connection in the UE. In embodiments of the present disclosure, the operation and processing may be executed in an RCS client SW. In this instance, to transfer the information to another layer or a module of the UE, a predetermined Application Programming Interface (API) may be called or utilized.

Figure 11:
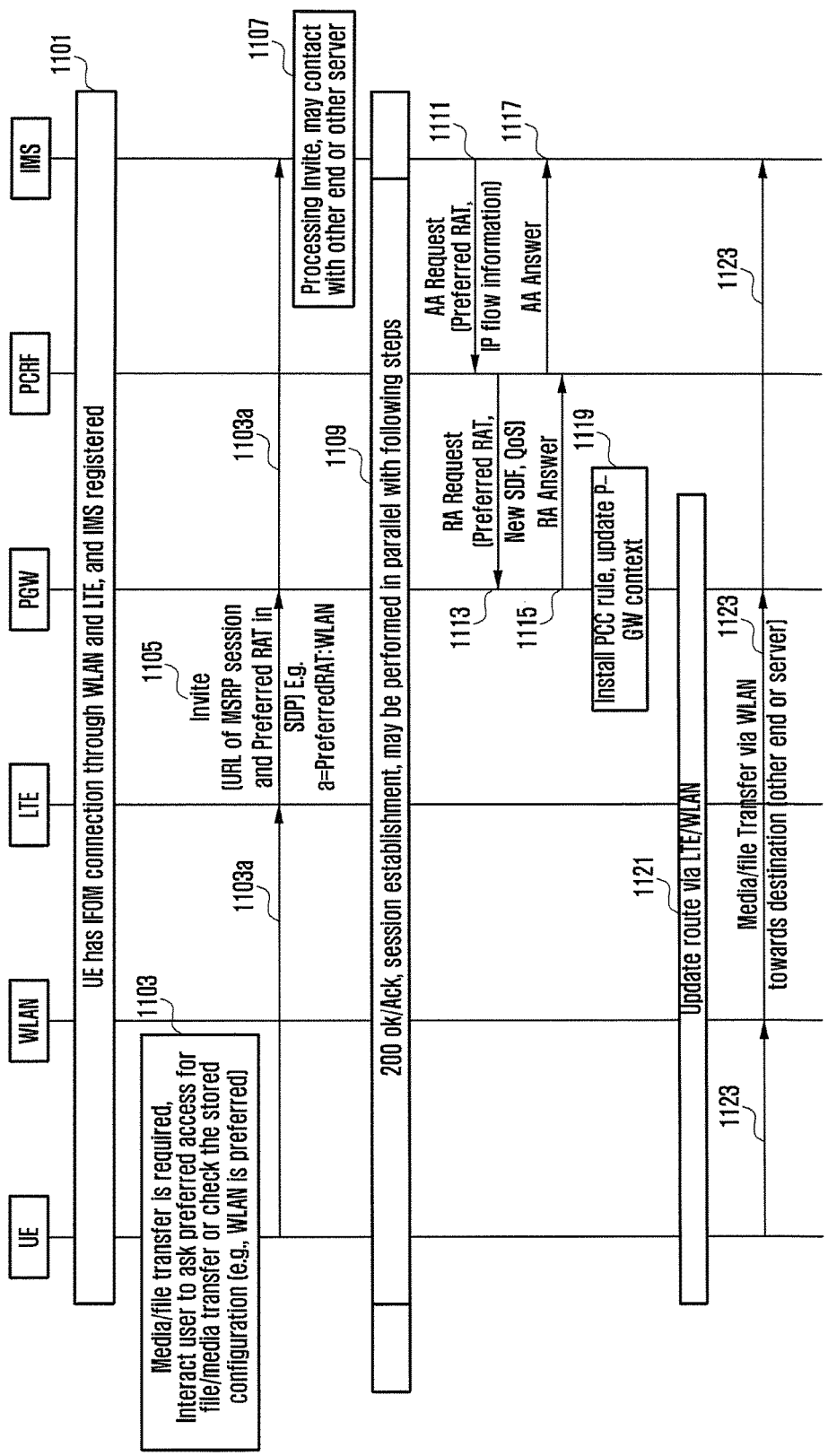
FIG. 11 illustrates a process of selecting an access network and setting a transmission path when new media file or file transmission begins according to embodiments of the present disclosure.

FIG. 11 illustrates a process of selecting an access network and setting a transmission path when new media file or file transmission begins.

The UE are simultaneously connected with a WLAN and LTE, and a PDN connection may be established through the WLAN and LTE. The UE is registered on an IMS through the PDN connection, and also, may receive a Rich Communication Suit (RCS) service, in operation 1101.

A user may select media file or file transmission through the UE. Although, for ease of description, embodiments of the present disclosure describes a media file or a file as an example, the present disclosure may not be limited to the media file or file transmission, and may be applied to any type of data. The UE may output a screen for inquiring about user's preferred access network from among access networks through which a media file or a file is to be transmitted or received, in operation 1103. When the user selects or inputs a preferred access network, the UE may recognize the same. Alternatively, when a preferred access network for transmitting a media file or a file is set in advance by the user, the UE may determine setting information.

The UE may transfer, to a server through a control message 1103a, information for beginning media file or file transmission. The control message 1103a may be an SIP message, and the server may be a server that supports an IMS. The control message 1103a may include information indicating an access network (Radio Access Technology (RAT)) preferred when the UE executes media file or file transmission. In embodiments of the present disclosure, the SIP message may be an INVITE message, in operation 1105. Also, in embodiments of the present disclosure, the SIP message may include Message Session Relay Protocol (MSRP) session information for creating a session for media file or file transmission. Also, in embodiments of the present disclosure, the preferred access network information may be an identifier indicating one of WLAN, 3GPP, E-UTRAN, UTRAN, and GERAN. Also, in embodiments of the present disclosure, the preferred access network information may be included as a part of a Session Description Protocol (SDP). In the case where the SDP is used, for example, when the preferred access network is the WLAN, the preferred access network information may be encoded into a form of "a=preferredRAT:WLAN." When the MSRP is used, the SDP information indicating the preferred access network may be included as a part of the SDP for the MSRP.

A server that processes a request from the user may receive a request message from the user and execute a process for processing the same. Particularly, the server may determine an access network preferred by the user for transmitting a media file or a file, based on the received information through the process. In the process, the server may exchange information with another server or a network entity, or may exchange control information with the counterpart UE, in operation 1107. In embodiments of the present disclosure, the server may be the IMS, and particularly, the server may be one of a Proxy-Call Session Control Function (P-CSCF), a Serving-Call Session Control Function (S-CSCF), and RCS Application Server (AS).

The server may execute a process for processing the request of the UE. In the process, a message indicating that the request of the UE is accepted may be transferred to the UE. In embodiments of the present disclosure, the message may be an OK message or an ACK message, in operation 1109. Also, the process may be executed in parallel with remaining processes to be described later, or may be executed after a few of the remaining processes.

The server may control QoS of an operator network, or may provide information associated with media file or file transmission to an entity that manages a policy, in operation 1111. In this instance, the provided information may include one or more pieces of information from among a type of access network preferred by a user for media file or file transmission and information (an IP address, port information, or the like) associated with a session through which a new media file or file is to be transmitted. In embodiments of the present disclosure, the entity may be a PCRF, and a message transmitted from the server may be a Diameter AA request message.

The QoS control or policy management entity provides information associated with media file or file transmission to a GW or a PCEF of the operator network, in operation 1113. In this instance, the provided information may include one or more pieces of information from among a type of access network preferred by a user for media file or file transmission and information (an IP address, port information, or the like) associated with a session through which a new media file or a file is to be transmitted. In embodiments of the present disclosure, the message may be a Diameter RA request message, and the provided information may be generated in a type of PCC rule. That is, when the PCC rule is used for transferring the information, the PCC rule may include information (WLAN, E-UTRAN, UTRAN, GERAN or the like) indicating an access network to be used for transmission, with respect to a single Service Data Flow (SDF). The PCRF that controls QoS or manages the policy of the operator network may provide a response to the AA request transmitted from the server, in operation 1117. Also, the GW (PGW) or the PCEF of the operator network may transmit an RA Answer to the PCRF, as a response to the RA request transmitted from the PCRF, in operation 1115. The GW or the PCEF of the operator network may generate a user context, transmit traffic, or execute an operation for controlling charging, based on the received information, in operation 1119. Particularly, when a new EPS bearer needs to be created for an access network preferred by the user (in the case of a GTP) or when binding update (in the case of a PMIP) is required, the GW or PCEF may execute an appropriate process. Through the process, the information associated with an access network (that is, a transmission path), through which data associated with a media file or a file is to be transmitted or received, may be transferred to the UE, in operation 1121.

Subsequently, the UE may transmit or receive the media file or the file through the set path, in operation 1123.

In the present embodiment, when the UE executes the reception of a media file or a file, a message that the UE transmits in process X of the present embodiment may be a 183 Session Progress or 200 Ok message among SIP messages, and the remaining operations and processes may be applied similarly.

Figure 12:
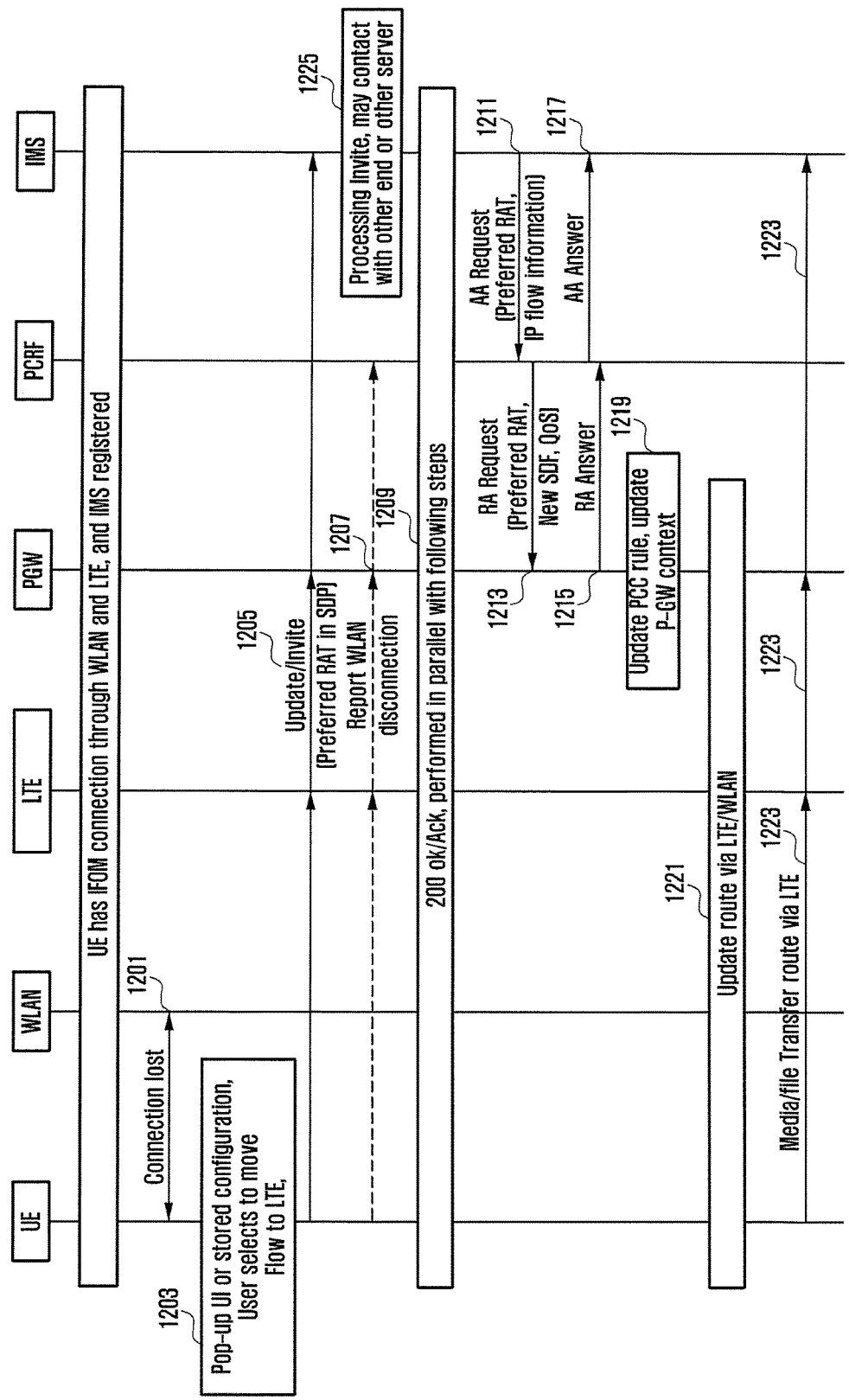
FIG. 12 illustrates a process of resetting a transmission path using LTE when a WLAN access is terminated while a media file or a file is transmitted through WLAN according to embodiments of the present disclosure.

FIG. 12 illustrates a process of resetting a transmission path using LTE when a WLAN access is terminated while a media file or a file is transmitted through the WLAN.

In FIG. 12, the descriptions will be provided by assuming that a UE transmits or receives a media file or a file through the WLAN. Although, for ease of description, embodiments of the present disclosure describes a media file or a file as an example, the present disclosure may not be limited to media file or file transmission and may be applied to any type of data.

The UE detects that a connection with the WLAN is terminated, in operation 1201. In FIG. 12, descriptions will be provided in association with the case of receiving, through a user UI, information indicating that a user prefers continuous media file or file transmission through an LTE network in operation 1203, or the case in which setting information is stored in advance. However, it is apparent that the present disclosure is not limited to only the case in which transmission is continued through the LTE network as described in FIG. 8.

The UE transmits, to the server, a message for newly configuring transmission information associated with a media file or a file, or for updating the same, in operation 1205. The control message may be an SIP message, and the server may be a server that supports an IMS. The control message may include information indicating an access network (Radio Access Technology (RAT)) preferred when the UE executes media file or file transmission. In embodiments of the present disclosure, the SIP message may be an UPDATE or INVITE message. Also, in embodiments of the present disclosure, the SIP message may include Message Session Relay Protocol (MSRP) session information for creating or updating a new session for media file or file transmission. Also, in embodiments of the present disclosure, the preferred access network information may be an identifier indicating one of WLAN, 3GPP, E-UTRAN, UTRAN, and GERAN. Also, in embodiments of the present disclosure, the preferred access network information may be included as a part of a Session Description Protocol (SDP). In the case where the SDP is used, for example, when the preferred access network is the WLAN, the preferred access network information may be encoded into a form of "a=preferredRAT:WLAN." When the MSRP is used, the SDP information indicating the preferred access network may be included as a part of the SDP for the MSRP.

In the case where the UE is set to report (subscribes to a report of) WLAN state information, when an event in which a state of the WLAN is changed occurs, the UE may report the same to an operator network or to the server, in operation 1207. In embodiments of the present disclosure, the changed WLAN state may be a WLAN connection state (that is, the state is changed from 'connected' into 'disconnected').

A server that processes a request from the user may receive a request message from the user and execute a process for processing the same. Particularly, the server may determine an access network preferred by the user for transmitting a media file or a file, based on the received information through the process. In the process, the server may exchange information with another server or a network entity, or may exchange control information with the counterpart UE, in operation 1225. In embodiments of the present disclosure, the server may be an IMS server, and particularly, the server may be one of a P-CSCF, an S-CSCF, and an RCS Application Server (AS).

The server may execute a process for processing the request of the UE. In the process, a message indicating that the request of the UE is accepted may be transferred to the UE, in operation 1209. In embodiments of the present disclosure, the message may be a 200 OK message or an ACK message. Also, the process may be executed in parallel with the remaining processes to be described later, or may be executed after a few of the remaining processes.

The server may provide information associated with media file or file transmission to an entity that control QoS of the operator network or manages a policy, in operation 1211. In this instance, the provided information may include one or more pieces of information from among a type of access network preferred by a user for media file or file transmission and information (an IP address, port information, or the like) associated with a session through which a media file or file is to be transmitted. In embodiments of the present disclosure, the entity may be a PCRF, and a message transmitted from the server may be a Diameter AA request message.

The entity that controls QoS or manages a policy provides information associated with media file or file transmission to a GW or a PCEF of the operator network, in operation 1213.

In this instance, the provided information may include one or more pieces of information from among a type of access network preferred by a user for media file or file transmission and information (an IP address, port information, or the like) associated with a session through which a media file or file is to be transmitted. In embodiments of the present disclosure, the message may be a Diameter RA request message, and the provided information may be generated in a type of PCC rule. That is, when the PCC rule is used for transferring the information, the PCC rule may include information (WLAN, E-UTRAN, UTRAN, GERAN, or the like) indicating an access network to be used for transmission, with respect to a single Service Data Flow (SDF).

The PCRF that controls QoS or manages the policy of the operator network, may provide a response to the AA request transmitted from the server, in operation 1217. Also, the GW (PGW) or the PCEF of the operator network may transmit, to the PCRF, an RA Answer, as a response to the RA request transmitted by the PCRF, in operation 1215.

The GW or the PCEF of the operator network may generate or update a user context, transmit traffic, or execute an operation for controlling charging, based on the received information, in operation 1219. Particularly, when a new EPS bearer needs to be created/updated for an access network preferred by the user (in the case of a GTP) or when binding update (in the case of a PMIP) is required, the GW or PCEF may execute an appropriate process. Through the process, the information associated with an access network through which data associated with a media file or a file is to be transmitted or received, that is, a transmission path, may be transferred to the UE, in operation 1221.

Subsequently, the UE may continuously transmit or receive the media file or the file through the newly set path, in operation 1223.

Although the embodiment of the present disclosure has been described in association with executing continuous transmission by resetting a path through LTE when the WLAN connection is terminated, the subject matter of the present disclosure is to reset a transmission path to another access network (that holds a connection) when an access network is terminated. For example, in the opposition case (when an LTE connection is lost while data has been transmitted through LTE), the embodiment of the present disclosure may apply the same process by changing LTE with WLAN.

Figure 13:
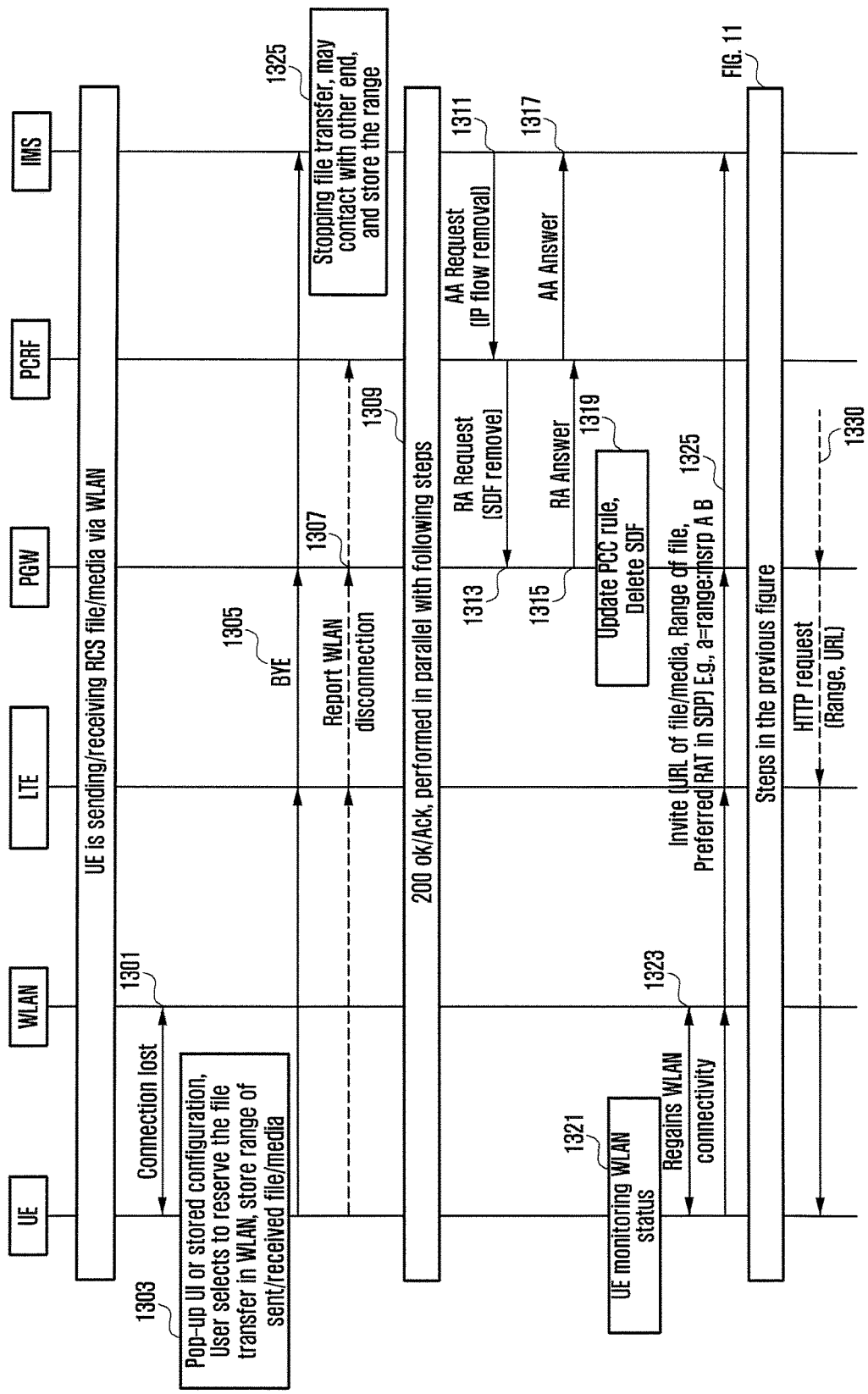
FIG. 13 illustrates a process of executing transmission continuously after a WLAN access is restored when the WLAN access is terminated while a media file or a file is transmitted through the WLAN according to embodiments of the present disclosure.

FIG. 13 illustrates a process of executing transmission continuously after a WLAN access is restored when the WLAN access is terminated while a media file or a file is transmitted through the WLAN.

The descriptions will be described based on the situation in which a UE transmits or receives a media file or a file through the WLAN. Although, for ease of description, embodiments of the present disclosure describes a media file or a file as an example, the present disclosure may not be limited to the media or file transmission, and may be applied to any type of data.

When the UE is disconnected with the WLAN in operation 1301, the UE detects that the connection with the WLAN is terminated. In the present embodiment of the present disclosure, descriptions will be provided in association with the case of receiving, through a user UI, information indicating that a user prefers to transmit or receive a media file or file, which has been transmitted, continuously after the WLAN connection is restored, or the case in which setting information is stored in advance. The UE may store information for transmitting or receiving the remaining part of the media file/file automatically after the WLAN connection is restored. The information may include information indicating that a preferred access network for transmitting the media file/file is the WLAN, and information indicating a part of which transmission or reception is completed out of the entire media file/file or information indicating a part that is to be transmitted or received subsequently, in operation 1303.

The UE may not transmit the media file or the file until the WLAN connection is restored, and thus, the UE may inform a server that the media file or file transmission is terminated, over an LTE network, in operation 1305. The control message may be an SIP message, and the server may be a server that supports an IMS. In embodiments of the present disclosure, the SIP message may be a BYE or UPDATE message. As described above, the message may include information indicating that a preferred access network for transmitting the media file/file is the WLAN and information indicating a part of which transmission or reception is completed out of the entire media/file or information indicating a part (range) that is to be transmitted or received subsequently.

In the case where the UE is set to report (subscribes to a report of) WLAN state information, when an event in which a state of the WLAN is changed occurs, the UE may report the same to an operator network or to the server, in operation 1307. In embodiments of the present disclosure, the changed WLAN state may be a WLAN connection state (that is, the state is changed from 'connected' into 'disconnected').

A server that processes a request from the user may receive a request message from the user and execute a process for processing the same, that is, an operation for suspending data transmission or reception, in operation 1325. In the process, the server may exchange information with another server or a network entity, or may exchange control information with the counterpart UE. In embodiments of the present disclosure, the server may be an IMS server, and particularly, the server may be one of a P-CSCF, an S-CSCF, and an RCS Application Server (AS).

The server may execute a process for processing the request of the UE. In the process, a message indicating that the request of the UE is accepted may be transferred to the UE, in operation 1309. In embodiments of the present disclosure, the message may be a 200 OK message or an ACK message. Also, the process may be executed in parallel with remaining processes to be described later, or may be executed after a few of the remaining processes.

The server may provide information associated with media or file transmission to an entity that controls QoS or manages a policy of the operator network, in operation 1311. In this instance, the provided information may include information indicating that an IP flow or an SDF should be deleted since the media file or file transmission is terminated. In embodiments of the present disclosure, the entity may be a PCRF, and the message transmitted from the server may be a Diameter AA request message.

The entity that controls QoS or manages the policy provides information associated with media file or file transmission to a GW or a PCEF of the operator network, in operation 1313. In this instance, the provided information may include information indicating that an IP flow or an SDF should be deleted since the media file or file transmission is terminated. In embodiments of the present disclosure, the message may be a Diameter RA request message, and the provided information may be generated in a type of PCC rule. When the PCC is used for transferring the information, the PCC rule may be set to include an operation of deleting an SDF.

The PCRF that controls QoS or manages the policy of the operator network, may provide a response to the AA request transmitted from the server, in operation 1317. Also, the GW (PGW) or the PCEF of the operator network may transmit an RA Answer to the PCRF, as a response to the RA request transmitted from the PCRF, in operation 1315. The GW or the PCEF of the operator network may update or delete a user context based on the received information. Particularly, when an EPS bearer needs to be updated or deleted (deactivated) (in the case of a GTP) or when binding update (in the case of a PMIP) is required, the GW or PCEF may execute an appropriate process, in operation 1319. Through the process, information indicating that a resource used for transmitting or receiving data associated with the media file or the file is deleted, may be transferred to the UE.

The UE may monitor a WLAN connection state in operation 1321. The monitoring may be executed through a module (for example, an RCS client) that processes the media file/file transmission or reception, by periodically calling an API that provides WLAN connection state information or subscribing for a notification association with the WLAN connection state.

When the WLAN connection is restored, the UE may transfer information for continuously executing media or file transmission, to the server through a control message, in operation 1325. The control message may be an SIP message, and the server may be a server that supports an IMS. The control message may include information indicating an access network (Radio Access Technology (RAT)) preferred when the UE executes media file or file transmission. In the present embodiment, the preferred access network may be WLAN or WiFi. Also, the control message may include information indicating a part (range) of a media file/file to be subsequently transmitted or received. In embodiments of the present disclosure, the SIP message may be an INVITE message. Also, in embodiments of the present disclosure, the SIP message may include Message Session Relay Protocol (MSRP) session information for creating a session for media file or file transmission. Also, in embodiments of the present disclosure, the preferred access network information may be included as a part of a Session Description Protocol (SDP). When the SDP is used, the preferred access network information may be encoded into a form of "a=PreferredRAT: WLAN," a range of a media file may be encoded in a form of "a=Range:bytes=A-B," and A indicates a starting point of the part to be transmitted or received and B indicates a ending point. When the MSRP is used, the SDP information indicating the preferred access network or the range may be included as a part of the SDP for the MSRP.

Subsequent operations are identical to operations 1101 to 1123 of FIG. 11.

Figure 14:
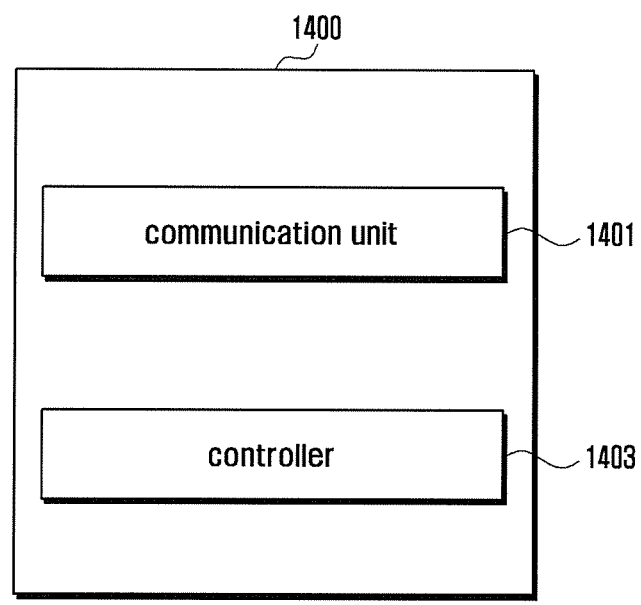
FIG. 14 illustrates a configuration of a UE according to embodiments of the present disclosure.

FIG. 14 is a diagram schematically illustrating a configuration of a UE according to embodiments of the present disclosure.

Referring to FIG. 14, a UE 1400 of the present disclosure may include a communication unit 1401 and a controller 1403.

Operations in association with a UE in various embodiments of the present disclosure have been described in detail with reference to drawings, and thus, representative operations will be described herein.

The communication unit 1401 may execute data communication. That is, it is a module for transmitting or receiving data.

The controller 1403 may obtain control information for selecting a network through which traffic is to be transmitted or received, transmit the obtained control information to a network, and transmit or receive the traffic using one of a first network and a second network, based on a response received from the network in response to the transmitted control information.

Also, the controller 1403 may determine whether the control information is included in the response received from the network, and when the determination shows that the control information is included in the response received from the network, may transmit or receive the traffic using one of the first network and the second network, based on the control information included in the received response.

Figure 15:
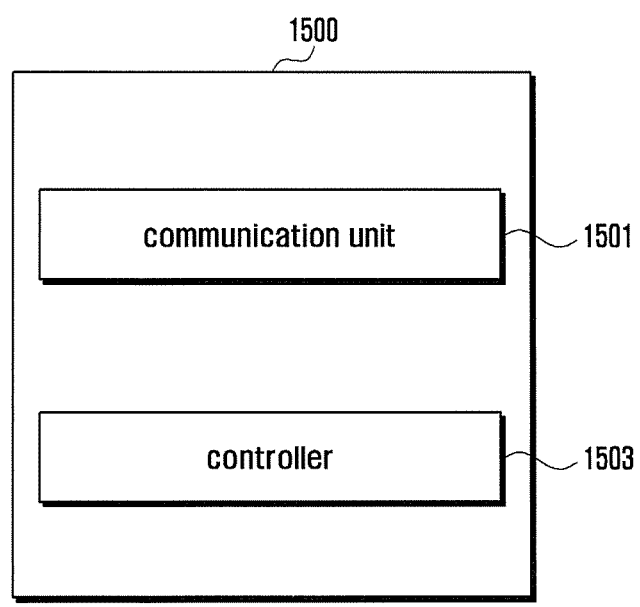
FIG. 15 illustrates a configuration of a network device according to embodiments of the present disclosure.

FIG. 15 is a diagram schematically illustrating a configuration of a network device according to embodiments of the present disclosure.

In the present disclosure, the network device refers to a terminal that transmits or receives data for a connection to a network, such as, an access point, a gateway, a UE, a router, or the like, and may not be limited to a predetermined gateway, a predetermined router, or the like. Particularly, it is apparent that the entities in the present disclosure, such as a TWAN/ePDG, an MME, a PGW, or the like may be embodied as network devices.

A network device 1500 of the present disclosure may include a communication unit 1501 and a controller 1503. The communication unit 1501 may execute data communication. That is, it is a module for transmitting or receiving data.

The controller 1503 receives a connection request message including control information from the UE, transmits, to a gateway of the network, the control information included in the connection request message, and receives a response to the control information from the gateway of the network.

Also, the controller 1503 may be a network gateway that receives control information for determining a network through which traffic is to be transmitted or received to/from a UE connected with a first network, determines a network through which the traffic is to be transmitted or received based on the received control information, and transmits or receives the traffic to/from the UE through the determine network through which the traffic is to be transmitted or received.

Each communication entity in embodiments of the present disclosure may include a transceiving unit that transmits/receives a signal to/from another communication entity and a controller that controls the transceiving unit and each communication entity to execute an operation associated with an embodiment. Operations of the controller may include an operation described in an embodiment and a general operation of controlling the communication entity. The controller may be configured through a plurality of logical or physical modules.

In the above embodiments, all operations may be optionally performed or may be omitted. Further, steps in each embodiment do not have to be sequentially performed and orders thereof may be changed. In addition, the embodiments disclosed in the specification and drawings are merely presented to easily describe technical details of the present disclosure and help the understanding of the present disclosure, and are not intended to limit the scope of the present disclosure. That is, it is obvious to those skilled in the art to which the present disclosure belongs that different modifications can be achieved based on the technical spirit of the present disclosure.

Although embodiments of the present disclosure have been shown and described in this specification and the drawings, they are used in general sense in order to easily explain technical contents of the present disclosure, and to help comprehension of the present disclosure, and are not intended to limit the scope of the present disclosure. It is obvious to those skilled in the art to which the present disclosure pertains that other modified embodiments on the basis of the spirits of the present disclosure besides the embodiments disclosed herein can be carried out.

What is claimed is:

1. A method for a user equipment (UE), the method comprising:
   generating a first connection with an evolved universal terrestrial access network (E-UTRAN) and a second connection with a wireless local area network (WLAN);
   generating control information for data packets for selecting a network among the E-UTRAN and the WLAN, wherein the control information includes at least one network selection criteria and priority information, and the priority information is determined based on the network selection criteria and types of the data packets;
   selecting the network satisfying the network selection criteria based on the priority information;
   receiving the data packets through the second connection;
   identifying that the second connection is disconnected before reception of the data packets through the second connection is completed, wherein a remaining part of the data packets has not been received;
   displaying first information indicating reception of the data packets being incomplete and a size of the remaining part of the data packets;
   responsive to displaying the first information, receiving a network selection input of a user associated with reception of the remaining part of the data packets;
   receiving the remaining part of the data packets through the first connection if the network selection input of the user is associated with the first connection; and
   receiving the remaining part of the data packets through the second connection after the second connection is reestablished if the network selection input of the user is associated with the second connection.

2. The method of claim 1, wherein receiving the network selection input of the user further comprises:
   receiving second information associated with an operation to be performed after the second connection is disconnected, the second information being determined based on the network selection input of the user.

3. The method of claim 2, further comprising:
   transmitting, through the first connection, third information indicating that the second connection is disconnected, if the second information indicates reception of the remaining part of the data packets through the first connection.

4. The method of claim 3, wherein the third information includes information indicating a range of the remaining part of the data packets.

5. The method of claim 2, further comprising:
   storing information for receiving the remaining part of the data packets, if the second information indicates reception of the remaining part of the data packets through the second connection after the second connection is reestablished.

6. The method of claim 5, wherein storing the information further comprises:
   monitoring whether the second connection is reestablished; and
   restarting the reception of the remaining part of the data packets through the second connection after the second connection is reestablished.

7. A user equipment (UE) comprising:
   a transceiver; and
   a controller configured to:
      generate a first connection with an evolved universal terrestrial access network (E-UTRAN) and a second connection with a wireless local area network (WLAN),
      generate control information for data packets for selecting a network among the E-UTRAN and the WLAN, wherein the control information includes at least one network selection criteria and priority information, and the priority information is determined based on the network selection criteria and types of the data packets,
      select the network satisfying the network selection criteria based on the priority information,
      receive the data packets through the second connection associated with the selected network,
      identify whether the second connection is disconnected before reception of data packets through the second connection is completed, wherein a remaining part of the data packets has not been received,
      display first information indicating reception of the data packets being incomplete and a size of the remaining part of the data packets,
      responsive to displaying the first information, receive a network selection input of a user associated with reception of the remaining part of the data packets,
      receive the remaining part of the data packets through the first connection if the network selection input of the user is associated with the first connection, and
      receive the remaining part of the data packets through the second connection after the second connection is reestablished if the network selection input of the user is associated with the second connection.

8. The UE of claim 7, wherein the controller is configured to:
   receive second information associated with an operation to be performed after the second connection is disconnected, the second information being determined based on the network selection input of the user.

9. The UE of claim 8, wherein the controller is configured to transmit, through the first connection, third information indicating that the second connection is disconnected, if the second information indicates reception of the remaining part of the data packets through the first connection.

10. The UE of claim 9, wherein the third information indicate s a range of the remaining part of the data packets.

11. The UE of claim 8, wherein the controller is configured to store information for receiving the remaining part of the data packets, if the second information indicates reception of the remaining part of the data packets through the second connection after the second connection is reestablished.

12. The UE of claim 11, wherein the controller is configured to:
   monitor whether the second connection is reestablished, and
   restart the reception of the remaining part of the data packets through the second connection after the second connection is reestablished.

* * * * *